(12) United States Patent
Kagan et al.

(10) Patent No.: US 10,649,621 B2
(45) Date of Patent: May 12, 2020

(54) FACILITATING PERFORMING SEARCHES AND ACCESSING SEARCH RESULTS USING DIFFERENT DEVICES

(71) Applicant: Samsung Electronics Co., Ltd., Suwon-si, Gyeonggi-do (KR)

(72) Inventors: Tomer Kagan, Sunnyvale, CA (US); Liron Shapira, Mountain View, CA (US); Taher Savliwala, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 14/577,800

(22) Filed: Dec. 19, 2014

(65) Prior Publication Data

US 2015/0254258 A1 Sep. 10, 2015

Related U.S. Application Data

(60) Provisional application No. 61/948,488, filed on Mar. 5, 2014.

(51) Int. Cl.
*G06F 16/95* (2019.01)
*G06F 3/0482* (2013.01)
(Continued)

(52) U.S. Cl.
CPC ............ *G06F 3/0482* (2013.01); *G06F 1/163* (2013.01); *G06F 3/04842* (2013.01);
(Continued)

(58) Field of Classification Search
None
See application file for complete search history.

(56) References Cited

U.S. PATENT DOCUMENTS 7,286,063 B2 10/2007 Gauthey et al.
8,562,489 B2 10/2013 Burton et al.
(Continued)

FOREIGN PATENT DOCUMENTS

CN 1527976 A 9/2004
CN 102483753 A 5/2012
(Continued)

OTHER PUBLICATIONS

CaixaBank, "CaixaBank supports "wearable banking" with the launch of applications for SmartWatch and Google Glass devices," Feb. 19, 2014.*
(Continued)

*Primary Examiner* — Usmaan Saeed
*Assistant Examiner* — Yu Zhao
(74) *Attorney, Agent, or Firm* — Jefferson IP Law, LLP

(57) ABSTRACT

Techniques include receiving a search query from a searching device and one or more of first data corresponding to the searching device or second data corresponding to a performing device. The searching device is configured to transmit search queries to a search system and receive search results from the search system in response to the search queries. Each search result indicates a function for a computing device to perform. The searching device is configured to display the search results, detect user selections of the search results, and transmit indications of the user selections to the performing device. The performing device is configured to perform functions indicated by the search results associated with the user selections in response to receiving the indications. The techniques further include generating search results based on the search query and based on the first and/or second data, and transmitting the search results to the searching device.

19 Claims, 18 Drawing Sheets

(51) Int. Cl.
*G06F 16/248* (2019.01)
*G06F 16/951* (2019.01)
*G06F 16/957* (2019.01)
*G06F 16/9537* (2019.01)
*H04L 29/08* (2006.01)
*G06F 1/16* (2006.01)
*G06F 3/0484* (2013.01)
*G06F 16/24* (2019.01)
*G06F 3/0488* (2013.01)

(52) U.S. Cl.
CPC .......... *G06F 16/248* (2019.01); *G06F 16/951* (2019.01); *G06F 16/957* (2019.01); *G06F 16/9537* (2019.01); *H04L 67/025* (2013.01); *G06F 3/04883* (2013.01)

(56) References Cited

U.S. PATENT DOCUMENTS

| | | | |
|---|---|---|---|
| 8,725,842 | B1 | 5/2014 | Al-Nasser |
| 8,781,791 | B2 | 7/2014 | Panther et al. |
| 8,964,947 | B1 | 2/2015 | Noolu et al. |
| 9,092,400 | B1 | 7/2015 | Lin et al. |
| 9,207,857 | B2 | 12/2015 | Snibbe et al. |
| 9,245,282 | B2 | 1/2016 | Song et al. |
| 9,317,155 | B2 | 4/2016 | Magi |
| 9,495,456 | B2 | 11/2016 | Petersen et al. |
| 9,526,420 | B2 | 12/2016 | Fish et al. |
| 9,594,354 | B1 | 3/2017 | Kahn et al. |
| 2002/0065802 | A1* | 5/2002 | Uchiyama ........... G06F 16/9535 |
| 2008/0036586 | A1 | 2/2008 | Ohki |
| 2008/0140779 | A1 | 6/2008 | Ahn et al. |
| 2009/0012940 | A1 | 1/2009 | Ives et al. |
| 2010/0293598 | A1 | 11/2010 | Collart et al. |
| 2010/0306191 | A1 | 12/2010 | Lebeau et al. |
| 2011/0045773 | A1 | 2/2011 | Yu et al. |
| 2011/0099157 | A1* | 4/2011 | LeBeau ............. H04M 1/72533 707/706 |
| 2011/0153590 | A1 | 6/2011 | Chang et al. |
| 2011/0275391 | A1 | 11/2011 | Lee et al. |
| 2012/0042343 | A1 | 2/2012 | Laligand et al. |
| 2012/0124062 | A1* | 5/2012 | Macbeth ................. G06F 9/445 707/749 |
| 2012/0173520 | A1 | 7/2012 | Wu et al. |
| 2012/0259930 | A1 | 10/2012 | Wu |
| 2012/0282914 | A1 | 11/2012 | Alexander |
| 2012/0289147 | A1* | 11/2012 | Raleigh ............... H04L 67/2847 455/3.06 |
| 2013/0065517 | A1 | 3/2013 | Svensson et al. |
| 2013/0074117 | A1 | 3/2013 | Song et al. |
| 2013/0111328 | A1 | 5/2013 | Khanna et al. |
| 2013/0170813 | A1 | 7/2013 | Woods et al. |
| 2013/0176502 | A1 | 7/2013 | Nagata et al. |
| 2013/0326502 | A1 | 12/2013 | Brunsman et al. |
| 2014/0059494 | A1 | 2/2014 | Lee et al. |
| 2014/0101535 | A1 | 4/2014 | Kim et al. |
| 2014/0278839 | A1 | 9/2014 | Lynam et al. |
| 2014/0335789 | A1 | 11/2014 | Cohen et al. |
| 2014/0358910 | A1* | 12/2014 | Frigon ................ G06F 17/3053 707/723 |
| 2014/0359598 | A1 | 12/2014 | Oliver et al. |
| 2014/0365462 | A1* | 12/2014 | Chang ............... G06F 17/30864 707/711 |
| 2015/0046418 | A1 | 2/2015 | Akbacak et al. |
| 2015/0073907 | A1 | 3/2015 | Purves et al. |
| 2015/0098309 | A1 | 4/2015 | Adams et al. |
| 2015/0170249 | A1* | 6/2015 | Cockcroft .......... G06Q 30/0627 705/26.63 |
| 2015/0230022 | A1 | 8/2015 | Sakai et al. |
| 2015/0253885 | A1 | 9/2015 | Kagan et al. |
| 2015/0254351 | A1 | 9/2015 | Kagan et al. |
| 2015/0254352 | A1 | 9/2015 | Kagan et al. |
| 2015/0254367 | A1 | 9/2015 | Kagan et al. |
| 2016/0019360 | A1 | 1/2016 | Pahwa et al. |
| 2016/0188681 | A1 | 6/2016 | Savliwala et al. |
| 2016/0316363 | A1 | 10/2016 | Li |
| 2016/0358629 | A1 | 12/2016 | Pribula |
| 2017/0011210 | A1 | 1/2017 | Cheong et al. |

FOREIGN PATENT DOCUMENTS

| | | |
|---|---|---|
| CN | 103270510 A | 8/2013 |
| WO | WO-0148977 A2 | 7/2001 |

OTHER PUBLICATIONS

International Search Report and Written Opinion for related WO Application Serial No. PCT/US2015/067850, dated Apr. 29, 2016.
International Search Report and Written Opinion for WO Application No. PCT/US2015/018950 dated Jun. 1, 2015.
Dobrygoski, "How to Set the Default Apps in Android", Mar. 8, 2013.
European Supplementary Search Report for EP Application No. 15758797.3 dated Jul. 19, 2017, 11 pages.
Dong et al.; "Similarity Search for Web Services"; Proceedings 2004 VLBF Conference, Aug. 31, 2004; 12 pages.
Ryan et al.; "Schema for Representing CORBA Object References in an LDAP Directory"; The Internet Society; Oct. 1999; 11 pages.
USPTO Office Action dated Dec. 21, 2017 for U.S. Appl. No. 14,577,602, Dec. 21, 2017.
Chinese Office Action dated Mar. 25, 2019, issued in a counterpart Chinese application No. 201580022904.9.
Chinese Office Action dated Sep. 9, 2019, issued in Chinese Patent Application No. 201580022904.7.
European Office Action dated Feb. 6, 2020, issued in European Patent Application No. 15758797.3-1213.

\* cited by examiner

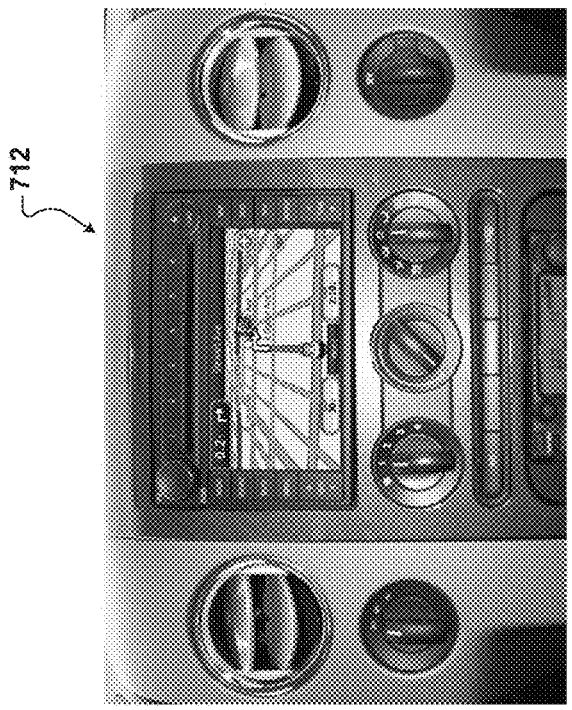
FIG. 7C
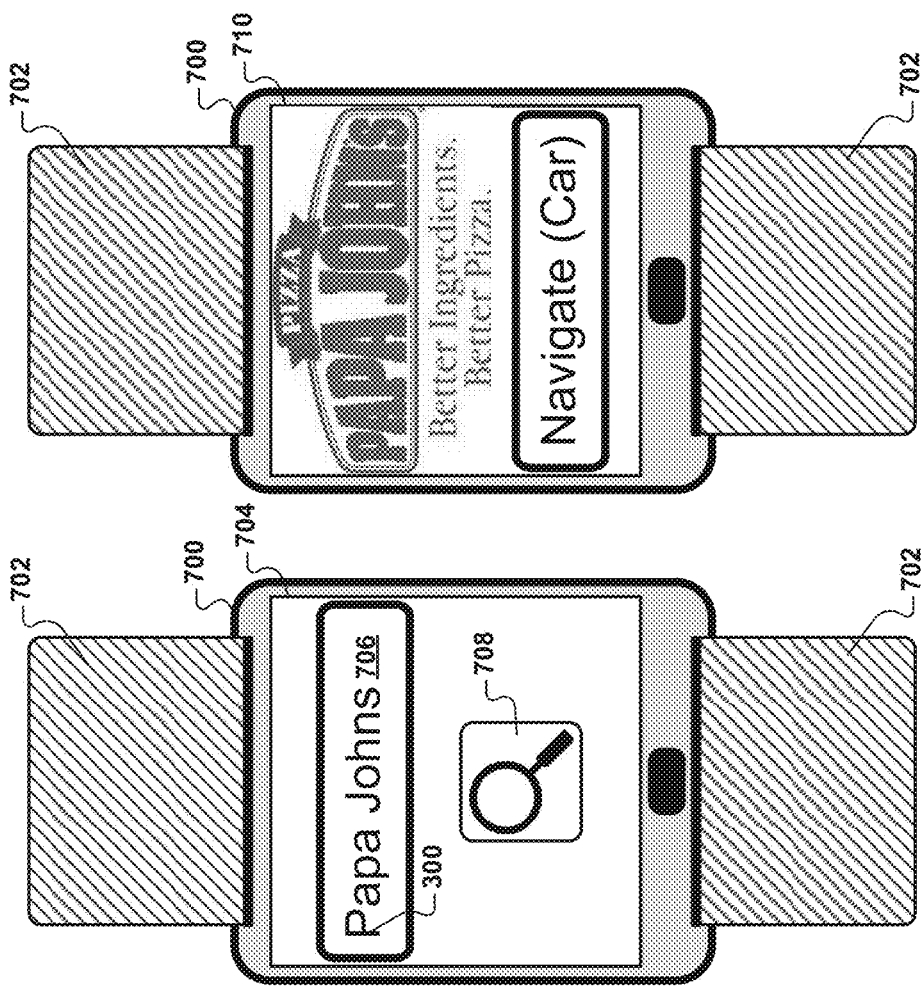
FIG. 7B
FIG. 7A

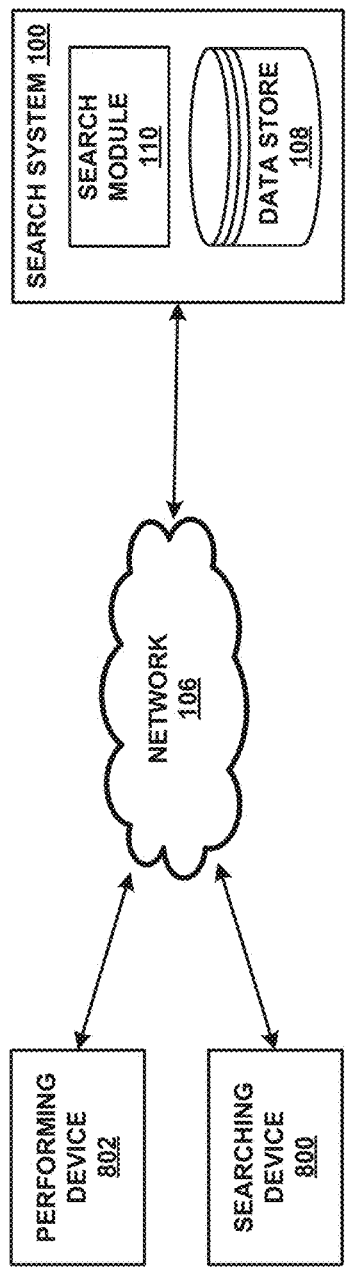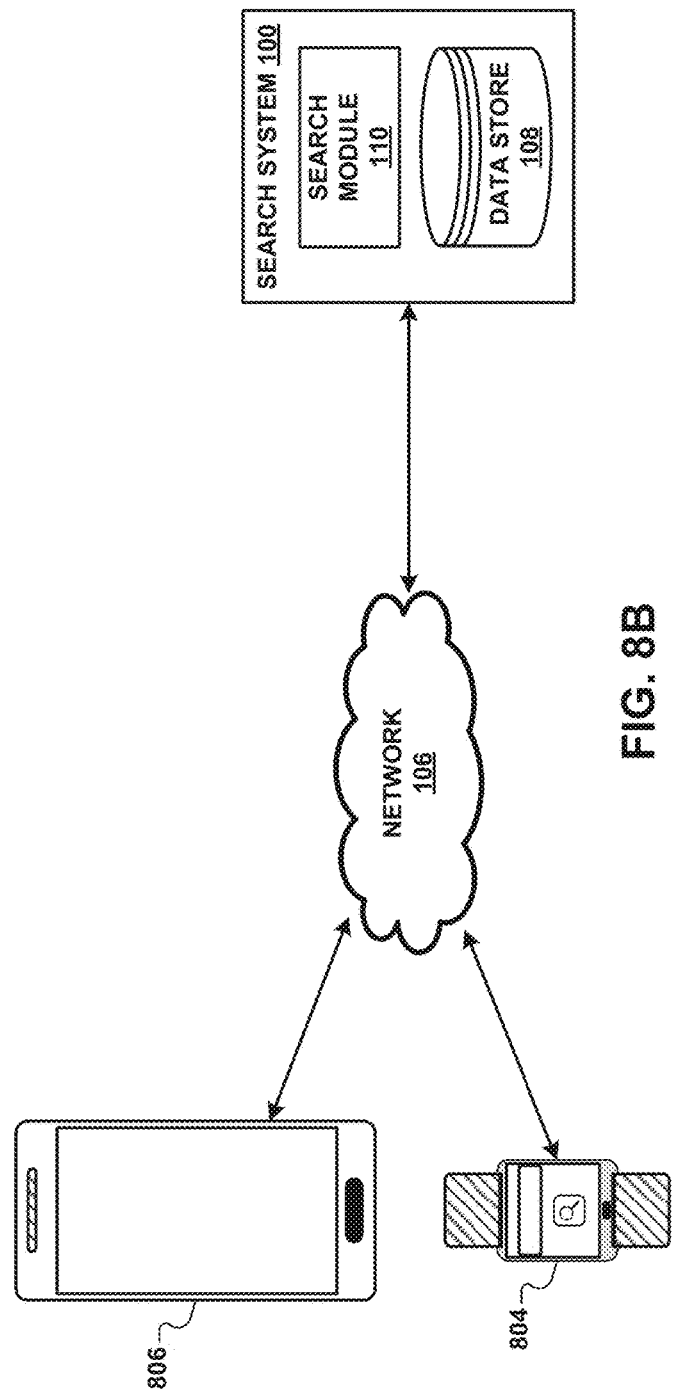

FACILITATING PERFORMING SEARCHES AND ACCESSING SEARCH RESULTS USING DIFFERENT DEVICES

CROSS-REFERENCE TO RELATED APPLICATION

This U.S. patent application claims priority under 35 U.S.C. § 119(e) to U.S. Provisional Application 61/948,488, filed Mar. 5, 2014, which is hereby incorporated by reference in its entirety.

TECHNICAL FIELD

This disclosure generally relates to the field of search, and more particularly to generating, displaying, and accessing search results on computing devices.

BACKGROUND

In recent years, the use of computers, smartphones, and other Internet-connected computing devices has grown significantly. Correspondingly, the number of software applications available for such computing devices has also grown. Today, many diverse software applications can be accessed on a number of different computing devices, including, but not limited to, smartphones, personal computers, automobiles, and televisions. These software applications can include business driven applications, games, educational applications, news applications, shopping applications, messaging applications, media streaming applications, and social networking applications, as some examples. Because of the large number of software applications available today and the wide range of functionality they provide, computing device users often require the ability to search for and access specific software application functionality.

SUMMARY

In one example, a method includes receiving, using a search system, a search query from a searching device and one or more of first data corresponding to the searching device and second data corresponding to a performing device. In this example, the searching device is configured to transmit search queries to the search system and receive search results from the search system in response to the search queries. Each search result indicates a function for a computing device to perform. The searching device is further configured to display the search results on the searching device, detect user selections of the search results at the searching device, and transmit indications of the user selections to the performing device. Also in this example, the performing device is configured to perform functions indicated by the search results associated with the user selections in response to receiving the indications. The method further includes generating, using the search system, one or more search results based on the search query and based on the one or more of the first data and the second data, and transmitting, using the search system, the one or more search results to the searching device.

In another example, a system includes a searching device, a performing device, and a search system. In this example, the search system is configured to receive a search query from the searching device and one or more of first data corresponding to the searching device and second data corresponding to the performing device. The search system is further configured to generate one or more search results based on the search query and based on the one or more of the first data and the second data, and transmit the one or more search results to the searching device. Also in this example, the searching device is configured to transmit search queries to the search system and receive search results from the search system in response to the search queries. Each search result indicates a function for a computing device to perform. The searching device is further configured to display the search results on the searching device, detect user selections of the search results at the searching device, and transmit indications of the user selections to the performing device. In this example, the performing device is configured to perform functions indicated by the search results associated with the user selections in response to receiving the indications.

In another example, a non-transitory computer-readable storage medium includes instructions that cause one or more computing devices to receive, using a search system, a search query from a searching device and one or more of first data corresponding to the searching device and second data corresponding to a performing device. In this example, the searching device is configured to transmit search queries to the search system and receive search results from the search system in response to the search queries. Each search result indicates a function for a computing device to perform. The searching device is further configured to display the search results on the searching device, detect user selections of the search results at the searching device, and transmit indications of the user selections to the performing device. Also in this example, the performing device is configured to perform functions indicated by the search results associated with the user selections in response to receiving the indications. The instructions further cause the one or more computing devices to generate, using the search system, one or more search results based on the search query and based on the one or more of the first data and the second data, and transmit, using the search system, the one or more search results to the searching device.

The details of one or more examples are set forth in the accompanying drawings and the description below. Other features, objects, and advantages will be apparent from the description and drawings, and from the claims.

BRIEF DESCRIPTION OF DRAWINGS

FIGS. 7A-7C are example GUIs that may be generated on a searching device and a performing device.

FIGS. 8A-9B are schematic views of example arrangements of a searching device and a performing device in communication with a search system via a network.

DETAILED DESCRIPTION

Figure 1:
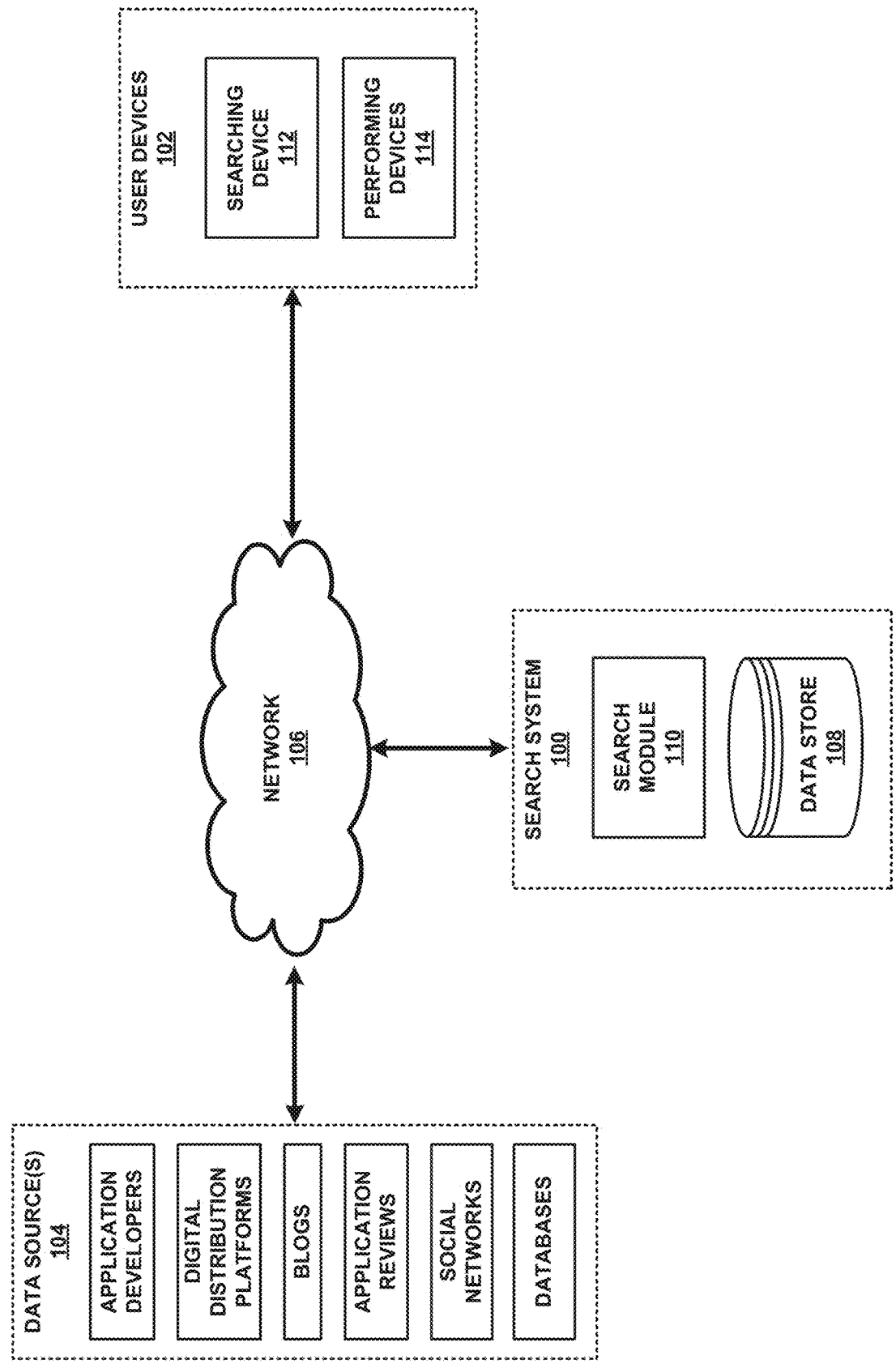
FIG. 1 is a schematic view of an example environment that includes a searching device, one or more performing devices, and a search system.

The present disclosure generally relates to the field of search, and, more particularly, to techniques for generating, displaying, and accessing search results on different computing devices. Specifically, the techniques of this disclosure are directed to a search system that facilitates performing a search for software applications using a particular user device (e.g., a "searching device") and performing functions indicated by search results generated as part of the search using a different user device (e.g., a "performing device"). In some examples, the searching device may be configured to transmit search queries to the search system and receive search results from the search system in response to the search queries. In these examples, each search result may indicate a function for a computing device to perform. For instance, each search result may include an access mechanism that, upon being received by a computing device, causes the computing device to set a software application included on the computing device into a particular application state. In these examples, the searching device may be further configured to display the search results on the searching device, detect user selections of the search results at the searching device, and transmit indications of the user selections to the performing device. The indications may each include one or more instructions or commands for the performing device. Also in these examples, the performing device may be configured to perform functions indicated by the search results associated with the user selections in response to receiving the indications. For example, the performing device may be configured to set software applications included on the performing device into particular application states using access mechanisms included in the search results associated with the user selections, in the manner described above.

According to the techniques disclosed herein, the search system may receive a search query from the searching device. For example, the searching device may receive the search query from a user of the searching device and transmit the search query to the search system. In some examples, the search system may receive the search query from the searching device via the performing device and/or another intermediate device. The search system may further receive one or more of first data corresponding to the searching device and second data corresponding to the performing device. The first and second data may describe the searching device and the performing device, respectively, in a variety of ways. In some examples, the first data may describe various attributes of the searching device, such as a display type (e.g., a display technology and/or display dimensions), a display resolution (e.g., a number of pixels in one or more dimensions), graphics processing and rendering capabilities (e.g., a graphics processing unit (GPU), or a similar resource), user interface (UI) capabilities (e.g., a touchscreen, a keypad, or a display), and network (e.g., Internet) connectivity associated with the searching device. In other examples, the second data may describe various attributes of the performing device, such as one or more native or web-based applications, an operating system (OS), a device type (e.g., one or more hardware devices or a hardware architecture), and network (e.g., Internet) connectivity associated with the performing device. In still other examples, the first and second data may describe various other properties of the searching and performing devices, such as whether and in which manner the searching and performing devices are connected to one another and to the search system (e.g., via one or more communication interfaces), as well as a location of one or more of the searching and performing devices. The search system may further generate one or more search results based on the search query and based on the one or more of the first data and the second data.

In some examples, the search system may generate the search results based on the first data such that the search results include formatting data that indicates how to render one or more of the search results as displayed search results on the searching device. In other words, in these examples, the formatting data may specify to the searching device how to display render using particular content, dimensions, resolution, and relative proportions) one or more of the search results on the searching device. In other examples, the formatting data may specify one or more UI elements (e.g., displayed user input fields, buttons, and text- or image-based user indicators) and/or real-time data (e.g., by referencing a source of the data) for the searching device to include as part of displaying one or more of the search results on the searching device.

In still other examples, the search system may select an access mechanism (e.g., a native application access mechanism, a web-based application access mechanism, or an application download address) that is compatible with the performing device based on the second data. For example, the search system may select the access mechanism from among multiple different access mechanisms (e.g., within a function record) upon determining that the access mechanism may be processed by a native application and/or a web-based application included on the performing device. Additionally, or alternatively, the search system may select the access mechanism upon determining that the access mechanism is compatible with an OS and/or a device type of the performing device, or based on network connectivity (e.g., in the case of an application download address) of the performing device. In these examples, the search system may include the selected access mechanism as part of the search results.

In some examples, the search system may generate the search results based on one or more of the first and second data such that the search results include interface data that specifies how (e.g., via which communication interface or other system or device and/or using which data type or format) the searching device indicates to the performing device that a user has selected a search result displayed on the searching device. For example, the search system may generate the interface data by determining whether and how the searching and performing devices are connected to one another and to the search system and/or based on various properties of one or more of the devices (e.g., OS and/or device type), as specified by the first and second data.

In other examples, in cases where the searching device selects a particular performing device from among multiple different performing devices, the search system may generate the search results based on the first and second data such that the search results include performing device selection data that indicates that the searching device should select the performing device. For example, the search system may generate the performing device selection data using locations of the searching and performing devices specified by the first and second data (e.g., upon determining that the performing device is the closest to the searching device among the multiple different performing devices).

The search system may transmit the one or more search results to the searching device. In some examples, the search system may transmit the one or more search results to the searching device via the performing device and/or another intermediate device.

A software application as described herein may refer to computer software that causes a computing device to perform a task. In some examples, a software application may be referred to as an "application," "app," or a "program." Example applications include, but are not limited to, word processing applications, spreadsheet applications, messaging applications, media streaming applications, social networking applications, and games.

Applications can be executed on a variety of different computing devices. For example, applications can be executed on mobile computing devices such as smart phones, tablets, and wearable computing devices (e.g., headsets and/or watches, such as so-called "smart watches"). Applications can also be executed on other types of computing devices having other form factors, such as laptop computers, desktop computers, computing devices that are installed in vehicles (e.g., so-called "vehicle navigation systems"), or other consumer electronic devices. In some examples, applications may be installed on a computing device prior to a user purchasing the computing device. In other examples, the user may download and install applications on the computing device after purchasing the computing device.

The functionality of an application may be accessed on the computing device on which the application is installed. Additionally, or alternatively, the functionality of an application may be accessed via a remote computing device. In some examples, all of an application's functionality may be included on the computing device on which the application is installed. These applications may function without communication with other computing devices (e.g., via the Internet). In other examples, an application installed on a computing device may access information from other remote computing devices during operation. For example, a weather application installed on a computing device may access the latest weather information via the Internet and display the accessed weather information to the user through the installed weather application. In still other examples, an application (e.g., a web-based application) may be partially executed by the user's computing device and partially executed by a remote computing device. For example, a web-based application may be an application that is executed, at least in part, by a web server and accessed by a web browser of the user's computing device. Example web-based applications may include, but are not limited to, web-based email, online auctions, and online retail sites.

As explained above, the present disclosure is directed to techniques for facilitating generating search results on a first user computing device and performing operations, or functions, indicated by the search results on a second user computing device. In some examples described herein, a user may select a search result on a first computing device (e.g., a smart watch) that then causes a second computing device (e.g., a smart phone, or tablet) to perform one or more operations, or functions, indicated by the selected search result. In some scenarios, the user may be in proximity to both the first and second computing devices. For example, the first computing device may be a wearable computing device (e.g., a smart watch on the user's wrist). In this example, the second computing device may be a mobile computing device (e.g., a smart phone in the user's pocket, or a tablet in the user's palm), or another type of computing device located in proximity to the user (e.g., a vehicle navigation system installed in the user's vehicle, or a television or personal computer present in the user's home). In other examples, the first computing device may be a mobile computing device, such as a smart phone, or a tablet, and the second computing device may be another computing device, such as a smart watch, a vehicle navigation system, a television, or a personal computer.

According to the techniques disclosed herein, a user enters a search query into a first computing device. The first computing device, which receives the search query, maybe be referred to herein as a "searching device." The searching device transmits the search query to a search system. In one example, the searching device may transmit the search query to the search system via another user computing device (e.g., a "performing device," or another intermediate computing device, which are described below) to which the searching device is tethered. The searching device being tethered to another user computing device, as described herein, may refer to the searching device being communicatively coupled to the other user computing device using a short-range wired and/or wireless communication interface or connection, such as, e.g., USB, Bluetooth®, Ethernet (e.g., LAN), and/or Wi-Fi® (e.g., wireless LAN (WLAN)). In this example, the other user computing device may then transmit the search query received from the searching device to the search system via the Internet. In another example, the searching device may not be tethered to another user computing device, but instead the searching device may be configured to connect to the search system directly via the Internet (e.g., via a cellular network, Wi-Fi®, and/or another wireless technology) and transmit the search query to the search system. The search system generates search results in response to receiving the search query and transmits the generated search results to the searching device. The searching device can then display the search results to the user. A search result that is displayed to the user may be referred to herein as a "displayed search result," or a "displayed result."

The user can select a displayed result on the searching device. In response to selection of the displayed result, the searching device indicates to a second computing device that the displayed result has been selected. The displayed result that is selected by the user on the searching device may be referred to herein as a "selected search result," or a "selected result." The second computing device, which receives the indication from the searching device that the user has selected the displayed result, may be referred to herein as a "performing device." The performing device performs one or more operations, or functions, according to the selected result in response to receiving the indication from the searching device. For example, the performing device can launch a native application included on the performing device and set the native application into a state indicated by the selected result. The user that entered the search query into the searching device can then view and interact with the launched native application on the performing device. In another example, instead of launching a native application, the performing device can show an expanded view of the selected result (e.g., a view that includes more image/text content and/or detail and graphical user interface (GUI) input/output options compared to the selected result). Displaying the expanded view of the selected result may be beneficial in scenarios where the user would like to view the selected result on a larger screen, assuming that the searching device (e.g., a smart watch) has a relatively limited display screen size and that the performing device (e.g., a smart phone, or a tablet) has a relatively larger display screen size.

According to the disclosed techniques, the search system further receives first data corresponding to the searching device (e.g., from the searching device) and second data corresponding to a performing device (e.g., from the performing device). Using the first and second data, the search system generates the search results such that the search results include one or more of formatting data, specifically selected access mechanisms, interface data, and performing device selection data, each of which is described in greater detail herein.

The techniques of the present disclosure may be implemented for various different network topology arrangements of the searching device, the performing device, and the search system In some examples (e.g., FIG. 9A), the searching device may be tethered to the performing device such that the searching device communicates with the search system via the performing device. For example, the searching device may communicate with the performing device via a short-range wired connection (e.g., USB) or a short-range wireless connection (e.g., Bluetooth®), and the performing device may communicate with the search system via the Internet (e.g., via a cellular network, or a home router). In other examples (e.g., FIG. 8A), the searching device and the performing device may independently communicate with the search system. For example, the searching device and the performing device may have their own separate wireless internee connections that each enable communication with the search system via the Internet. The separate wireless connections may be wireless connections to the same wireless router at home, for example. The separate wireless connections may also be different types of wireless connections, depending on the connectivity options available on the searching device and the performing device. For example, the searching device may be configured to communicate with the Internet via a cellular radio, or network, connection and the performing device may be configured to communicate with the Internet via a Wi-Fi® connection.

While in some examples, a searching device of the present disclosure can indicate a selected result to one performing device, in other examples, the searching device may indicate a selected result to multiple different performing devices. In these examples, the multiple performing devices can perform functions indicated by the searching device (i.e., by the selected result), such as opening, or launching, native applications and/or a web browser to a state indicated by the searching device by the selected result). Examples in which a single searching device indicates a selected result to multiple different performing devices are shown and described with respect to FIGS. 12-13.

Figure 5:
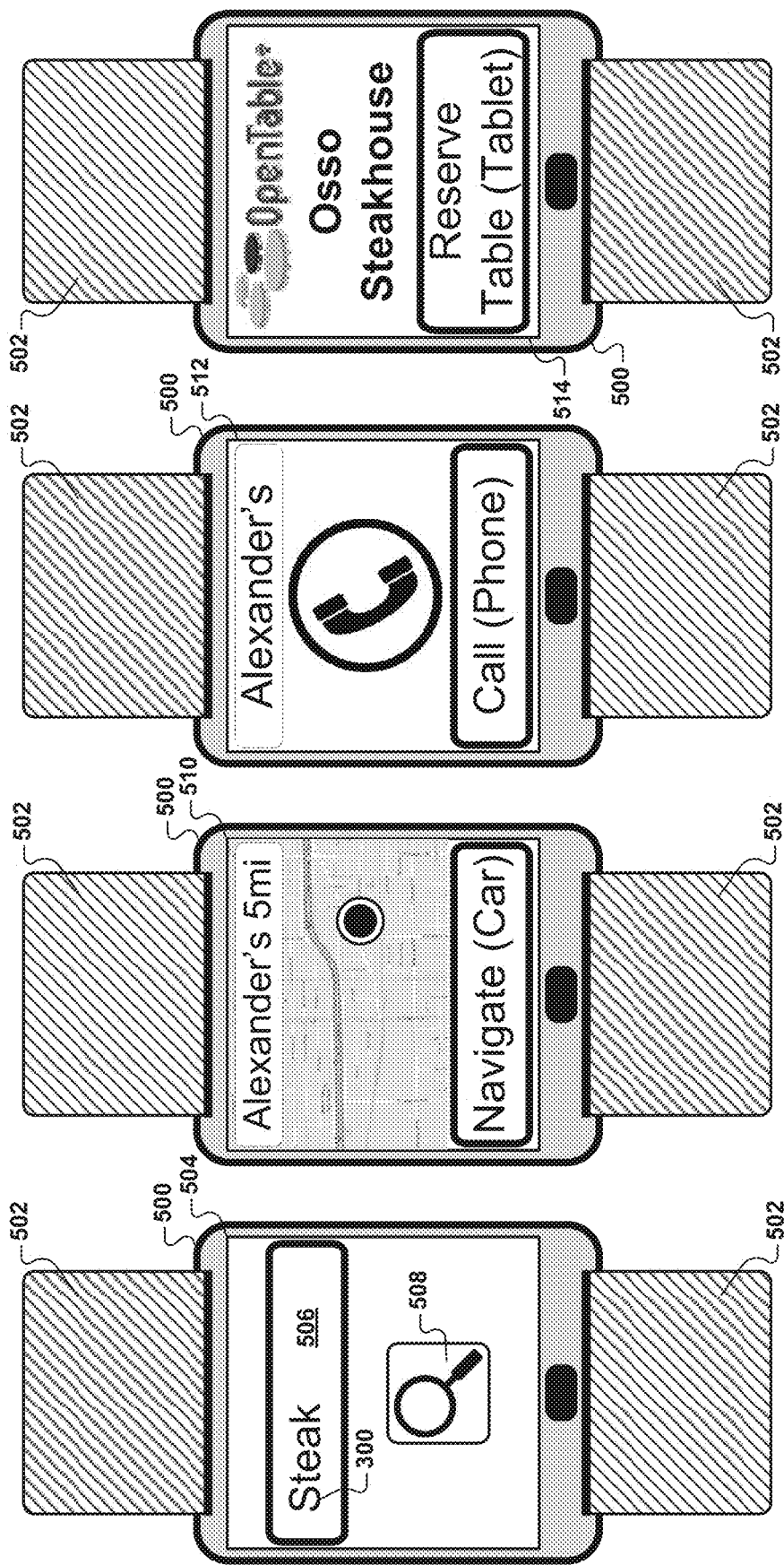
FIGS. 5A-5D are example graphical user interfaces (GUIs) that may be generated on a searching device.
Figure 6:
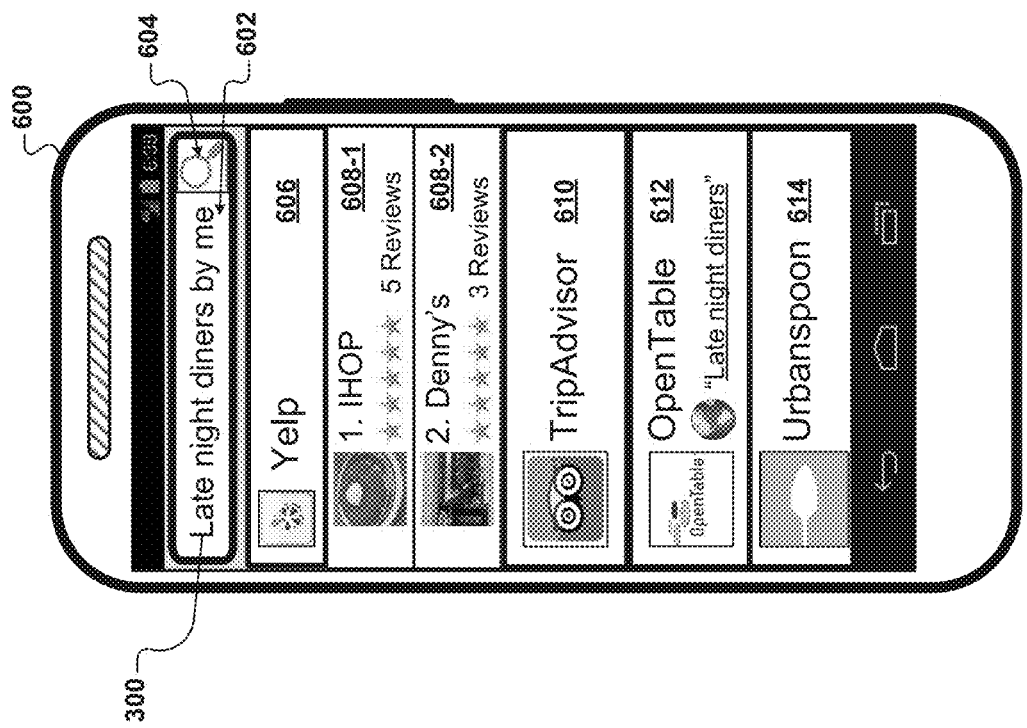
FIG. 6 is an example GUI that may be generated on a searching device.

The search results generated by the search system include one or more result objects. A single result object may refer to data associated with a single search result (e.g., a single displayed result, or a single selected result). The search system transmits the result Objects to the searching device. The searching device then generates one or more displayed results using the result objects. For example, the searching device may generate one displayed result for each result object received from the search system. In some implementations, the searching device may display only a single displayed result at a time (e.g., as shown in FIGS. 5B-5D). For example, if the searching device has a relatively small screen size (e.g., as in the case of a wrist watch computing device, such as a smart watch), then it may be beneficial to fill the entire display of the searching device with a single displayed result. In this example, a user may use a gesture (e.g., a swipe) on a touchscreen of the searching device, or interact with a physical button of the searching device, in order to show another single displayed result, such as a next displayed result in an order of the displayed results. While in some examples, the searching device may be configured to show only a single displayed result, in other examples, the searching device may be configured to display multiple different displayed results at a time (e.g., as shown in FIG. 6). For example, the searching device may display a list of multiple displayed results, e.g., according to the order of the displayed results. The user may select one of the displayed results from the list. Additionally, the user may interact with the list to scroll through the list using a gesture (e.g., a swipe) on a touchscreen of the searching device, or interact with a physical button of the searching device.

A result object may include a variety of different data described herein. A result object may include one or more access mechanisms for accessing functionality of an application. For example, a result object may include on or more application access mechanisms (AAMs). Additionally, or alternatively, a result object may include a web access mechanism (WAM). In some examples, a result object may include an application download address. AAMs, WAMs, and application download addresses are described in greater detail below. A result object may also include additional data used by the searching device to generate a displayed result. For example, a result object can include text and/or images that may be displayed in the displayed result. The text and/or images displayed to a user may indicate the operations, or function, that will be performed in response to selection of the displayed result. For example, if the displayed result is for a song in a music playing application, the text and/or images may identify the music playing application that will be launched by the performing device and the song that will be played by the music playing application when the user selects the displayed result. Example displayed results are shown in FIGS. 5A-7C.

A result object may also include formatting data (e.g., instructions) that defines how to render a displayed result, as described herein. The searching device can render a displayed result based on such formatting data included in a result object corresponding to the displayed result. In other words, the result object can include the formatting data that defines graphical aspects (e.g., formatting and arrangement) of the displayed result, such as layout of text, images, and animations in the displayed result. In some examples, the formatting data that defines how to render the displayed result may be device-specific data that indicates different formatting and arrangement depending on display capabilities of the searching device. For example, if the searching device has a relatively smaller display (e.g., a smart watch display), then the formatting data may indicate how to render the displayed result on the smaller display (e.g., as one displayed result per screen of the smaller display). If the searching device has a relatively larger display, the formatting data may indicate how to render the displayed result on the larger display (e.g., as an entry in a list of multiple displayed results). In other examples, the searching device may receive a result object that does not include such formatting data. In these examples, the searching device (e.g., a native application, a web browser, and/or an OS of the searching device) may determine how to format a displayed result corresponding to the received result object.

A result object may also include data (e.g., formatting data) that defines additional UI elements, such as user inputs and outputs, as also described herein. Example user inputs may include, but are not limited to, graphical buttons, text boxes, and menus (e.g., drop down menus). Example user outputs may include GUI elements configured to display text and/or graphics to the user. A result object can also include data (e.g., formatting data) that defines how to retrieve information from the Internet (e.g., an application server, a web server, and/or the search system). For example, portions of a displayed result generated for a result object received in response to a search query may be populated in real-time after the search query is transmitted (i.e., after the result object is received and the displayed result is generated). In this example, the result object may include data that instructs the searching device where to obtain the real-time data (e.g., via a web address). The real-time data may include a variety of different types of data, including, but not limited to, weather data, ticket availability, stock market data, restaurant table availability, and current taxi locations. A result object can also include instructions (e.g., formatting data) for performing calculations, such as calculations based on a user input. For example, a result object may include data used to render a calculator (e.g., scientific and/or graphing), or a similar mathematical interface, within a corresponding displayed result. Example data included in a result object may be generated by the search system according to a function record described with respect to FIG. 4.

Figure 9A:
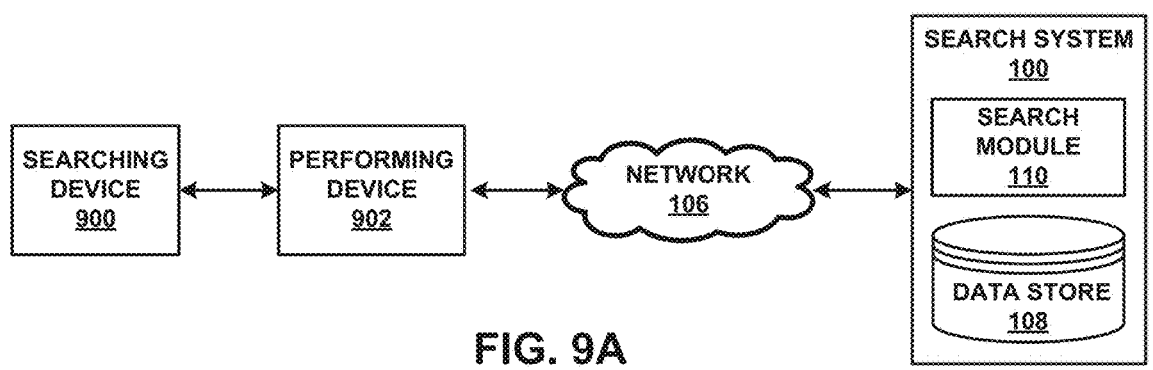

A result object may further include interface data (e.g., instructions) that defines how the searching device indicates selection of the displayed result to the performing device, as also described herein. In examples where the searching device is directly connected (e.g., wirelessly via Bluetooth®) to the performing device, using the interface data, the searching device can indicate a selection of a displayed result to the performing device via the direct connection, as shown in FIG. 9A. In examples where the searching device is not directly connected (e.g., via a wireless connection, or a wired connection) to the performing device, using the interface data, the searching device can indicate a selection of a displayed result to the performing device by transmitting an indication of the selection to the performing device via the Internet, or a more local network, such as a home or business network (e.g., LAN or WLAN).

The indication of the selected result sent from the searching device to the performing device can include a variety of different types of data. In some examples, the interface data may specify the type(s) of data included in the indication. In some examples, the indication may include one or more access mechanisms (e.g., AAM(s), WAM(s), and/or application download address(es)). For example, using the interface data, the searching device may transmit one or more AAMs of the selected result to the performing device so that the performing device can access a state of a native application installed on the performing device. In this example, using the interface data, the searching device may transmit an application download address also included in the selected result to the performing device so that the performing device can download and install the native application. In another example, using the interface data, the searching device may transmit a WAM of the selected result to the performing device so that the performing device can access a web address (e.g., a URL) using a web browser installed on the performing device. In examples where the searching device receives the search results via the performing device (e.g., via the tethered connection of FIG. 9A), the searching device may not need to transmit an access mechanism, but instead may indicate to the performing device which search result (e.g., via a rank number) has been selected by the user (e.g., as specified by the interface data). In these examples, since the performing device relays the search results to the searching device, the performing device may already have one or more access mechanisms included in the search results stored in the performing device. This may allow the searching device to simply indicate which search result has been selected by the user without explicitly transmitting an access mechanism for the selected result. In still another example, using the interface data, the searching device may transmit a function identifier (ID) to the performing device. In this example, the performing device may use the function ID to access a function record used by the search system to generate the selected result. The performing device may then select one or more access mechanisms associated with the search result from the identified function record.

The indication transmitted by the searching device to the performing device may indicate one or more operations for the performing device to perform. As described above, the indication may either include an access mechanism (e.g., an AAM, a WAM, and/or an application download address), or specify a location from which the access mechanism can be retrieved. For example, an AAM may be a string that includes a reference to a native application and indicates one or more operations for the performing device (e.g., the native application) to perform. A WAM may include a resource identifier (e.g., a URL) that directs a web browser of the performing device to a web resource. An application download address may include data used by the performing device to download a native application referenced in an AAM (e.g., from a digital distribution platform). AAMs, WAMs, and application download addresses are described in greater detail hereinafter.

Transmission of the indication of the selected result from the searching device to the performing device may involve a variety of different network paths (e.g., as specified by the interface data). In examples where the searching device is directly connected to the performing device via a wired connection e.g., USB) or a wireless connection (e.g., a short-range wireless connection such as Bluetooth®), the searching device may transmit the indication to the performing device via the direct connection (e.g., via the wired connection or short-range wireless connection). In examples where the searching device is not directly connected to the performing device, the searching device may transmit the indication to the performing device via a network. For example, the searching device may transmit the indication to the performing device via the Internet. As another example, the searching device may transmit the indication to the performing device through a more local network (e.g., a home network, such as a LAN or WLAN). In still other examples, the searching device may transmit the indication to the search system and the search system may then transmit the indication to the performing device.

In examples where the searching device indicates a function ID to the performing device, the searching device may transmit the function ID directly to the performing device, which may then retrieve one or more access mechanisms included in the corresponding function record from the search system. In another example, the searching device may transmit the function ID to the performing device via the Internet or a more short-range network (e.g., a business or home network), and the performing device can send the function ID to the search system to retrieve the access mechanisms from the search system. In another example, the searching device may transmit the function ID to the search system, which may then transmit the access mechanisms to the performing device.

The searching device generates displayed results based on data included in result objects received by the searching device. For example, with respect to FIGS. 5B-5D, the searching device may generate a single displayed result based on data included in a single result object received by the searching device. In some examples, the searching device may generate multiple displayed results on the display of the searching device at one time. For example, with respect to FIG. 6, multiple different displayed results are viewable by the user on the display of the searching device at one time.

In some examples, the searching device may generate only a single displayed result at a time. For example, the single displayed result may occupy the entire viewable area of the display of the searching device. Put another way, in some examples, the searching device may be configured to display only one displayed result at a time. The searching device may be configured to display only a single displayed result in scenarios where the searching device has limited display area. For example, if the searching device is a wearable computing device (e.g., a wrist watch computing device, such as a smart watch), then the display of the searching device may be limited in size (e.g., have a screen diagonal size of 2 inches or less in some cases). In these examples, generating a single displayed result may allow the user to fully view the displayed result and easily assess whether the displayed result is desirable for the user to select.

The way in which a user selects a displayed result may vary depending on the format of the displayed result. In some examples, a user may select a displayed result by touching (e.g., tapping) a portion of the displayed result. For example, the user may select the displayed result by touching the portion of the display of the searching device including the displayed result. In examples where the searching device displays only a single search result, the user may select the single displayed result by touching anywhere on the display. In still other examples, the displayed result may include regions that are indicated as places where the user may tap to select the displayed result. For example, the displayed result may include a button graphic (e.g., the button including the string "Navigate" of FIG. 5B) that indicates where the user can tap to select the displayed result. In some examples, the displayed result may include text and/or images that indicate the action that will be taken when the user interacts with the displayed result. For example, the displayed result may indicate a native application that will be launched on the performing device, a web location that will be accessed using a web browser of the performing device, or an expanded view that will be shown on the performing device.

In some examples, the performing device 114 may be determined by the searching device 112 and/or the search system 100 based on the relative geo-location of the searching device 112 and the performing device 114. For example, the searching device 112 may determine which computing devices are near (e.g., in the same location or within a short distance) the searching device 112 (e.g., based on geo-location) and then transmit an indication of the selected result to the performing device(s) 114 that are near to the searching device 114. The search system 100 may facilitate the geo-location determinations made by the searching device 112. Example, the search system 100 may determine the geo-location of the searching device 112 based on geo-location data included in the query wrapper. The search system 100 may also maintain communication with other possible performing devices 114 to determine the location of the other possible performing devices 114. For example, the possible performing devices 114 may include software that communicates their positions to the search system 100.

FIG. 1 shows an example environment that includes a search system 100, user devices 102, one or more data sources 104, and a network 106. In the example environment of FIG. 1, the search system 100 includes a data store 108 and a search module 110. Also in this example, the user devices 102 include a searching device 112 and one or more performing devices 114. The data source(s) 104 are described in greater detail below with reference to FIG. 3. According to the techniques disclosed herein, the searching device 112 receives a search query from a user of the searching device 112 (e.g., via a user interface of the searching device 112) and transmits the search query to the search system 100. In some implementations, the searching device 112 includes the search query in a query wrapper. The search system 100 receives the search query from the searching device 112. The search system 100 also receives one or more of first data corresponding to the searching device 112 and second data corresponding to one of the performing device(s) 114. The search system 100 generates one or more search results (e.g., one or more result objects) in response to receiving the search query. Specifically, the search system 100 generates the search results based on the search query and based on the one or more of the first data and the second data. The search system 100 transmits the search results (e.g., the result objects) to the searching device 112 that provided the search query. The data store 108 and the search module 110 included in the search system 100 are used to generate the result objects, as described herein. Operation of an example search system 100 including the data store 108 and the search module 110 is now described.

In some implementations, the searching device 112 may transmit additional data to the search system 100 along with the search query. In these implementations, the searching device 112 may include the additional data and the search query in a query wrapper. The query wrapper may include the search query as well as data associated with the search query. Examples of the additional data can include, but are not limited to, geo-location data (e.g., data indicating the location of the searching device 112), platform data (e.g., a version of an OS of the searching device 112, a device type of the searching device 112, such as a smart watch, a smart phone, or a tablet, and a version of a web browser of the searching device 112), an identity of a user of the searching device 112 (e.g., a username), partner specific data, and other data. According to the techniques described herein, any of the above-described data associated with the searching device 112 may be included in the first data, which may be transmitted to the search system 100 within the query wrapper or separately. The searching device 112 transmits the query wrapper to the search system 100. The search system 100 can use the search query and, in some examples, the additional data included in the query wrapper (e.g., the first data) to generate the search results.

In some examples described herein, the searching device 112 can transmit the query wrapper to one of the performing device(s) 114. This may be the case if the searching device 112 connects to the Internet, thereby connecting to the search system 100, via the performing device 114. In examples where the performing device 114 receives the query wrapper from the searching device 112, the performing device 114 may modify the query wrapper generated by the searching device 112 and transmit the modified query wrapper to the search system 100. For example, the performing device 114 may add, remove, or otherwise modify data included in the query wrapper received from the searching device 112. In some examples, the performing device 114 may add data (e.g., add the second data) to the query wrapper indicating information related to the performing device 114. For example, the performing device 114 may add data to the query wrapper such as geo-location data (e.g., indicating the location of the performing device 114), platform data (e.g., indicating a version of an OS of the performing device 114, a device type of the performing device 114, and a version of a web browser of the performing device 114), and an identity of a user of the performing device 114 (e.g., a username). According to the techniques described herein, any of the above-described data associated with the performing device 114 may be included in the second data, which may be transmitted to the search system 100 within the query wrapper or separately. In these examples, the query wrapper received by the search system 100 from the performing device 114 may include data related to both the searching device 112 and the performing device 114 (e.g., the first and second data). Accordingly, the search system 100 may determine specific information for each of the computing devices, such as an OS of each device, a geo-location of each device, and a device type of each device. For example, the search system 100 may determine whether the searching device 112 and the performing device 114 include a wearable computing device (e.g., a smart watch, a head-mounted display, such as so-called "smart glasses," or so-called "smart contact lenses"), a smart phone, a tablet computing device, a laptop computing device, or a desktop computing device. As described herein, in some examples, the search system 100 may generate and/or augment the search results (e.g., the result objects) transmitted by the search system 100 to the searching device 112 based on the device type, or any other properties, of the searching device 112 and/or the performing device 114 indicated by the data included in the query wrapper. As one example, the search system 100 may use the device type of the searching device 112 indicated by the query wrapper to generate formatting data to be included in the search results. The formatting data may define how the search results will be displayed on the searching device 112, as described herein. As another example, the search system 100 may use the device type of the performing device 114 indicated by the query wrapper to include one or more access mechanisms (e.g., an AAM, a WAM, and/or an application download address) that are compatible with the performing device 114 in the search results, as also described herein. In other examples, the search system 100 may generate interface data and/or performing device selection data based on one or more of the first and second data, as also described herein.

The search system 100 includes the data store 108 that the search system 100 uses to generate the search results. The data store 108 includes one or more different function records (e.g., the function record 400 of FIG. 4). Each function record may include data related to a function of a native application and/or a state of the native application resulting from performance of the function. As described herein, a function record may include a function ID, application state information (ASI), one or more access mechanisms, and other result object data described above. The access mechanisms can include, but are not limited to, one or more AAMs, one or more WAMs, and/or one or more application download addresses. The function records described herein may include additional data in some examples. In other examples, the function records may include less data than that shown in FIG. 4. For example, a function record may include an AAM, but not include a WAM. In another example, a function record may include a WAN, but not include an AAM. In some examples, a function record may include multiple different AAMs.

An AAM may be a string that includes a reference to a native application and indicates one or more operations for a user device 102 (e.g., one of the performing device(s) 114) to perform. In response to selection of the AAM by a user on the searching device 112, the performing device 114 may launch the native application referenced in the AAM and perform the one or more operations indicated by the AAM. For example, the performing device 114 may perform the one or more operations to set the native application into a particular state.

Native applications can perform a variety of different functions for a user. For example, a restaurant reservation application can make reservations for restaurants. As another example, an internet media player application can stream media (e.g., a song, or a movie) from the Internet. In some examples, a single native application can perform more than one function. For example, a restaurant reservation application may allow a user to retrieve information about a restaurant, read user reviews for the restaurant, and view a menu of the restaurant. As another example, an internet media player application may allow a user to perform searches for digital media, purchase digital media, stream digital media, and generate digital media playlists.

An AAM includes data which a user device 102 (e.g., one of the performing device(s) 114) can use to access functionality provided by a native application. For example, an AAM can include data that causes a performing device 114 to launch a native application installed on the performing device 114 and perform a function associated with the native application. Performance of a function according to an AAM may set a native application into a specified state. Accordingly, the process of launching a native application and performing a function according to an AAM may be referred to herein as launching the native application and setting the native application into a state that is specified by the AAM. In one example, an AAM for a restaurant reservation application can include data that causes a performing device 114 to launch the restaurant reservation application and make a reservation at a restaurant or indicate available reservation times. In this example, the restaurant reservation application may be set in a state that displays reservation information to a user, such as a reservation time, a description of the restaurant, and user reviews. In another example, an AAM for an internet media player application can include data that causes a performing device 114 to launch the internet media player application and stream media from the Internet. In this example, the internet media player application may be set in a state that displays information regarding the media (e.g., music) being streamed, such as a song name, an artist name, or an album name.

AAMs may have various different formats and content. The format and content of an AAM may depend on the native application with which the AAM is associated and the operations that are to be performed by the native application in response to selection of the AAM. For example, an AAM for an interne music player application may differ from an AAM for a shopping application. The AAM for the internet music player application may include references to musical artists, songs, and albums, for example. The AAM for the internet music player application may also reference operations, such as randomizing a list of songs and playing a song or album. The AAM for the shopping application may include references to different products that are for sale. The AAM for the shopping application may also include references to one or more operations, such as adding products to a shopping cart and proceeding to a checkout.

A user may select a displayed result on the searching device 112 to cause one of the performing device(s) 114 to launch a native application identified in the displayed result and perform one or more operations according to an AAM associated with the displayed result. Put another way, when a user selects a displayed result on the searching device 112, the performing device 114 launches a native application installed on the performing device 114 and sets the native application into a state defined by an NAM associated with the displayed result. In general, a state of a native application may refer to one or more operations and/or a resulting outcome of the native application performing the operations in response to a user selection of a displayed result. A state of a native application may also be referred to herein as an "application state."

An application state of a native application specified by an AAM may depend on the functionality provided by the native application. For example, if a native application is configured to retrieve and display information from an external resource (e.g., a web server) via the Internet, the native application can be set into a state in which the native application retrieves information from the external resource via the Internet and displays the information to the user. In another example, if a native application is configured to play media from an external resource via the Internet (e.g., music and/or video), the native application can be set into a state in which the native application is playing a song or a movie from the external resource via the Internet. In another example, if a native application is configured to make restaurant reservations, the native application can be set into a state in which the native application displays available restaurant reservations to the user.

An AAM included in a function record includes data that causes a user device 102 (e.g., one of the performing device(s) 114) to launch a native application and perform a function associated with the native application. For example, an AAM included in a function record may be a string that includes a reference to a native application and indicates one or more operations for a performing device 114 (e.g., the native application) to perform. An AAM may include an application resource identifier (ARI) and/or one or more operations for a performing device 114 to perform. An ARI may be a string having an application specific scheme in some examples. The ARI may include a reference to a native application and indicate one or more operations for a performing device 114 (e.g., the native application installed on the performing device 114) to perform. For example, the API may include a reference to the native application, a domain name, and a path to be used by the native application to retrieve and display information to the user. An example ARI is described with reference to the function record 400 of FIG. 4.

In some examples, an AAM may include operations for a performing device 114 to perform in addition to one or more operations indicated by an ARI of the AAM. For example, a native application installed on a performing device 114 and/or an OS of the performing device 114 may perform these additional operations included in the AAM. In some examples, the operations may be included in a script. Examples of the operations may include, but are not limited to, launching a native application, creating and sending a search request to an application server, setting a current geographic location in a native application, making a restaurant reservation, sending a text message, and adding an appointment to a calendar.

In some examples, an AAM may not include an ARI. Instead, the AAM can include one or more operations that reference a native application and indicate one or more operations for a performing device 114 to perform. The one or more operations may include instructions for the native application and/or an OS of the performing device 114. In response to selection of the AAM, the performing device 114 may perform the operations included in the AAM.

A function ID included in a function record may be a string that uniquely identifies the function record among other function records included in the data store 108. In some examples, the function ID may describe a function and/or an application state in human-readable form. For example, the function ID may be a human-readable string that describes a function performed according to an AAM and/or an application state resulting from performance of the function according to the AAM. In a more specific example, a function ID of a function record that describes a song within an internet music player application may include a name of the internet music player application along with a name of the song that will be played when the internet music player application is set into an application state defined by an AAM included the function record. An example function ID is described with reference to the function record 400 of FIG. 4.

A function record includes ASI. The ASI includes data that describes an application state into which a native application is set according to an AAM included in the function record. In some examples, the ASI may include data that describes a function performed according to the AAM included in the function record. The ASI can include text, numbers, and symbols that describe the application state or function. The types of data included in the ASI may depend on the type of information associated with the application state and the functionality specified by the AAM.

In some examples, the ASI includes data that is presented to the user when the native application is in the application state defined by the AAM. For example, a function record associated with a shopping application can include ASI that describes products (e.g., names and prices) that are shown when the shopping application is set into an application state defined by AAM of the function record. As another example, a function record associated with a music player application can include ASI that describes a song (e.g., name and artist) that is played when the music player application is set into an application state defined by an AAM of the function record.

The ASI included in a function record may be generated in a variety of different ways. In one example, data to be included in the ASI may be retrieved via partnerships with database owners and developers of native applications. For example, the data may be automatically retrieved from online databases that include, but are not limited to, data related to movies, television programs, music, and restaurants. In some examples, some data included in the ASI may be manually generated by a human operator. The data included in the ASI may be updated over time so that the search system 100 provides up-to-date search results.

The search system 100 generates one or more search results including one or more result objects using the function records included in the data store 108. Initially, the search system 100 analyzes a search query received from the searching device 112. The search system 100 then identifies a set of function records included in the data store 108 based on the received search query. The identified set of function records may be referred to herein as a "consideration set." For example, the search system 100 may identify the consideration set based on one or more matches (e.g., text matches) between one or more terms of the search query and one or more terms of the ASI included in the function records of the consideration set.

The search system 100 processes (e.g., scores) the consideration set. For example, the search system 100 may determine how well the function records of the consideration set match the received search query. In a specific example, the search system 100 may determine how well terms of the search query match terms of ASI of the identified function records of the consideration set using Lucene® information retrieval software developed by the Apache Software Foundation. The search system 100 may then select one or more function records that best match the received search query (e.g., the highest-scoring function records) from the consideration set to use in generating the result objects. The search system 100 then generates the result objects based on the selected function records. For example, the search system 100 may select access mechanisms (e.g., AAMs, WAMs, and application download addresses) from the selected function records to include in the result objects. The search system 100 then transmits the result objects to the searching device 112 that generated the search query. The searching device 112 receives the search results including the result objects, displays the search results to a user, detects a user selection of one of the displayed results, and transmits an indication of the user selection to one of the performing device(s) 114. The performing device 114 performs a function associated with the selected result in response to receiving the indication, as described herein.

Figure 4:
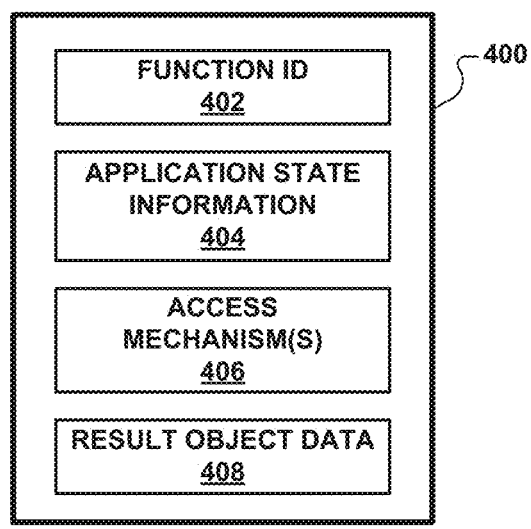
FIG. 4 is a schematic of an example function record of a search system.

As described above, the function records of the present disclosure are not required to have the format shown in FIG. 4. For example, the function records may include additional information in addition to that included in the function record of FIG. 4. In some examples, the function records may include less data than that included in the function record of FIG. 4. For example, a function record may include a single AAM and no WAM. In other examples, a function record may include multiple AAMs and no WAM. In still other examples, a function record may include a WAM but not an AAM.

Figure 2:
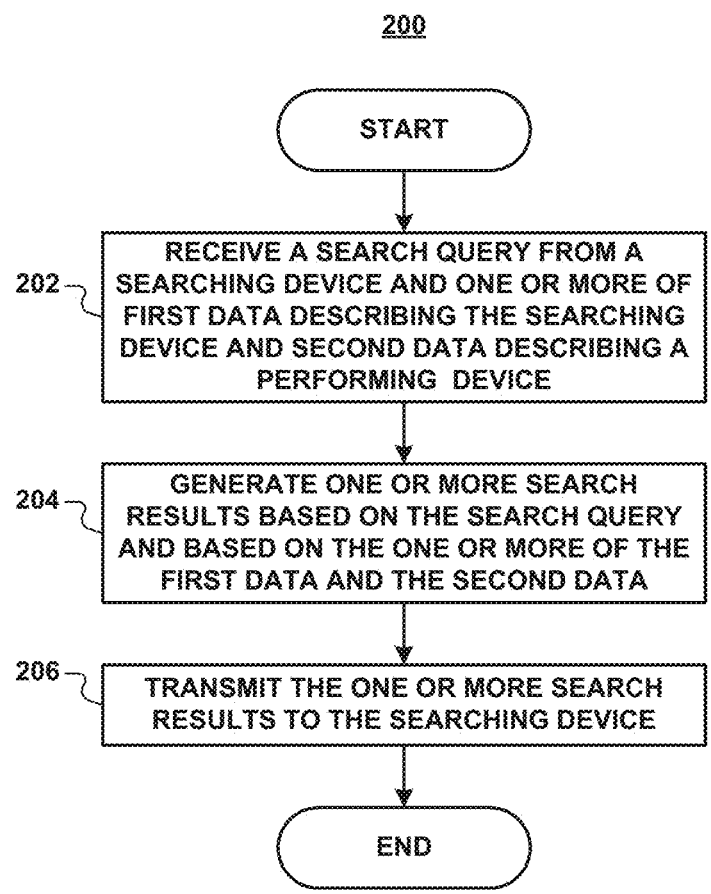
FIG. 2 is a flow diagram of an example method for facilitating performing a search and accessing results of the search using different devices.

FIG. 2 is a flow diagram that shows an example method 200 for facilitating performing a search using a searching device 112 and accessing results of the search using a performing device 114. In block 202, the search system 100 receives a search query from a searching device 112 and one or more of first data corresponding to the searching device 112 and second data corresponding to a performing device 114. The search query may include text, numbers, and/or symbols (e.g., punctuation) entered into the searching device 112 by a user of the searching device 112. For example, the user may have entered the search query into a search field (e.g., a search box) of a search application running on the searching device 112. The user may have entered the search query using a touchscreen keypad, a mechanical keypad, and/or via speech recognition. As described herein, in some examples, the search application may be a native application dedicated to search, or a more general application, such as a web browser application.

The searching device 112 can be any computing device that is capable of providing search queries and the first data to the search system 100. The searching device 112 can be, but is not limited to, a wearable computing device (e.g., a smart watch), a smart phone, a tablet computer, a laptop computer, or a desktop computer. The searching device 112 may also be another computing device having another form factor, such as a computing device included in a vehicle, a gaming device, a television, or other appliance (e.g., a networked home automation device, or a home appliance).

The searching device 112 may use a variety of different operating systems. In an example where the searching device 112 is a mobile device, the searching device 112 may run an OS including, but not limited to, ANDROID® developed by Google Inc., IOS® developed by Apple Inc., WINDOWS PHONE® developed by Microsoft Corporation, or TIZEN® developed by the Linux Foundation. In an example where the searching device 112 is a laptop or desktop computing device, the searching device 112 may run an OS including, but not limited to, MICROSOFT WINDOWS® developed by Microsoft Corporation, MAC OS®) developed by Apple Inc., or LINUX® (LIMA® is the registered trademark of Linus Torvalds in the U.S. and other countries). The searching device 112 may also access the search system 100 while running operating systems other than those operating systems described above, whether presently available or developed in the future.

The searching device 112 can communicate with the search system 100 via a computer network (e.g., the network 106), such as the Internet. In some examples, the searching device 112 may communicate with the search system 100 using a native application installed on the searching device 112 (e.g., a search application). In general, the searching device 112 may communicate with the search system 100 using any application that can transmit search queries to the search system 100. In some examples, the searching device 112 may run an application that is dedicated to interfacing with the search system 100, such as an application dedicated to searches (e.g., a search application). In other examples, the searching device 112 may communicate with the search system 100 using a more general application, such as a web browser application. The application run by the searching device 112 to communicate with the search system 100 may display a search field (e.g., the search field 506 of FIG. 5A) within a GUI into which the user may enter search queries. The user may enter a search query using a touchscreen or physical keyboard, a speech-to-text program, or another form of user input. In some examples, the application run by the searching device 112 may also transmit the first data to the search system 100.

In general, a search query may be a request for information retrieval (e.g., search results) from the search system 100. For example, a search query may be directed to retrieving a list of one or more displayed results that indicate native application functionality or application states in examples where the search system 100 is configured to generate a list of AAMs as search results. A search query directed to retrieving a list of search results related to native applications may indicate a user's desire to access functionality of one or more native applications described by the search query.

In block 204, the search system 100 generates one or more search results (e.g., one or more result objects) based on the search query and based on the one or more of the first data and the second data, as described herein. In block 206, the search system 100 transmits the search results to the searching device 112. The searching device 112 receives the search results the result objects) from the search system 100. The searching device 112 generates displayed results based on the received search results (e.g., the result objects). In other words, the searching device 112 renders the result objects of the search results into displayed results. The searching device 112 outputs the displayed results to the user via the search application running on the searching device 112 (e.g., as a search engine results page, or "SERP," within a GUI of the search application). The user may interact with the searching device 112 (e.g., swipe a touchscreen, or use a physical button) in order to browse through the displayed results.

The searching device 112 detects, or receives, the user's selection of one of the displayed results (i.e., a user selection of one of the search results). The user may select a displayed result by interacting in some way with the displayed result. The searching device 112 may detect the user's selection by detecting the user interaction. In some examples, the user may tap the displayed result to select the displayed result. In this example, the searching device 112 may detect the tapping of the displayed result. In some examples, the entire displayed result may be tapped by the user to select the displayed result. In other examples, a displayed result may include a region (e.g., a graphical button) in which the user should tap in order to select the displayed result. The user may select a displayed result in any suitable manner. For instance, the user may use voice controls to select a displayed result.

The searching device 112 transmits an indication of the user selection to the performing device 114, as described above. In some examples, the indication may include one or more instructions or commands for the performing device 114. In these examples, the performing device 114 may perform a function specified by the selected result in response to receiving the indication, as described below. For example, the performing device 114 may perform the function using the one or more instructions or commands included in the indication. In one specific example, to transmit the indication to the performing device 114, the searching device 112 may broadcast an "intent" (e.g., in the case of the ANDROID® OS) to the performing device 114 that causes the performing device 114 to perform the function. In another specific example, the searching device 112 may transmit data to the performing device 114 that causes the performing device 114 to broadcast the intent, thereby causing the performing device 114 to perform the function. Accordingly, as described herein, the searching device 112 may include at least one of an OS, one or more native applications, and a web browser application that are configured to communicate with the search system 100, receive a search query from a user, provide a query wrapper including the search query and provide the first data to the search system 100, receive search results from the search system 100, generate displayed results, receive a user input indicating a selected result, and transmit an indication of the selected result to the performing device 114.

The performing device 114 performs a function indicated by the selected result. For example, the performing device 114 may perform a function according to an AAM or a WAM associated with the selected result. As described above, in some examples, the performing device 114 may perform the function using one or more instructions or commands included in the indication of the user selection received by the performing device 114 from the searching device 112. The performing device 114 can be any computing device that is capable of transmitting the second data to the search system 100, receiving an indication of a user selection of a search result from the searching device 112, and performing a function according to the selected result. The performing device 114 can be, but is not limited to, a wearable computing device (e.g., a smart watch), a smart phone, a tablet computer, a laptop computer, and a desktop computer. The performing device 114 may also be another computing device having another form factor, such as computing device included in a vehicle, a gaming device, a television, or other appliance (e.g., a networked home automation device, or a home appliance). The performing device 114 may use a variety of different operating systems, as described herein with respect to the searching device 112.

The performing device 114 can communicate with the search system 100 via a computer network, such as the Internet. For instance, the performing device 114 may communicate with the search system 100 in examples where the searching device 112 communicates with the search system 100 via the performing device 114 (e.g., by being tethered to the performing device 114). In some examples, the performing device 114 may communicate with the search system 100 using a native application installed on the performing device 114. In other examples, the performing device 114 may communicate with the search system 100 using a more general application, such as a web browser application. Accordingly, as described herein, the performing device 114 may include at least one of an OS, one or more native applications, and a web browser application that are configured to communicate with the searching device 112 and the search system 100 (e.g., to transmit the second data) and perform the functions indicated by the selected result.

Figure 3:
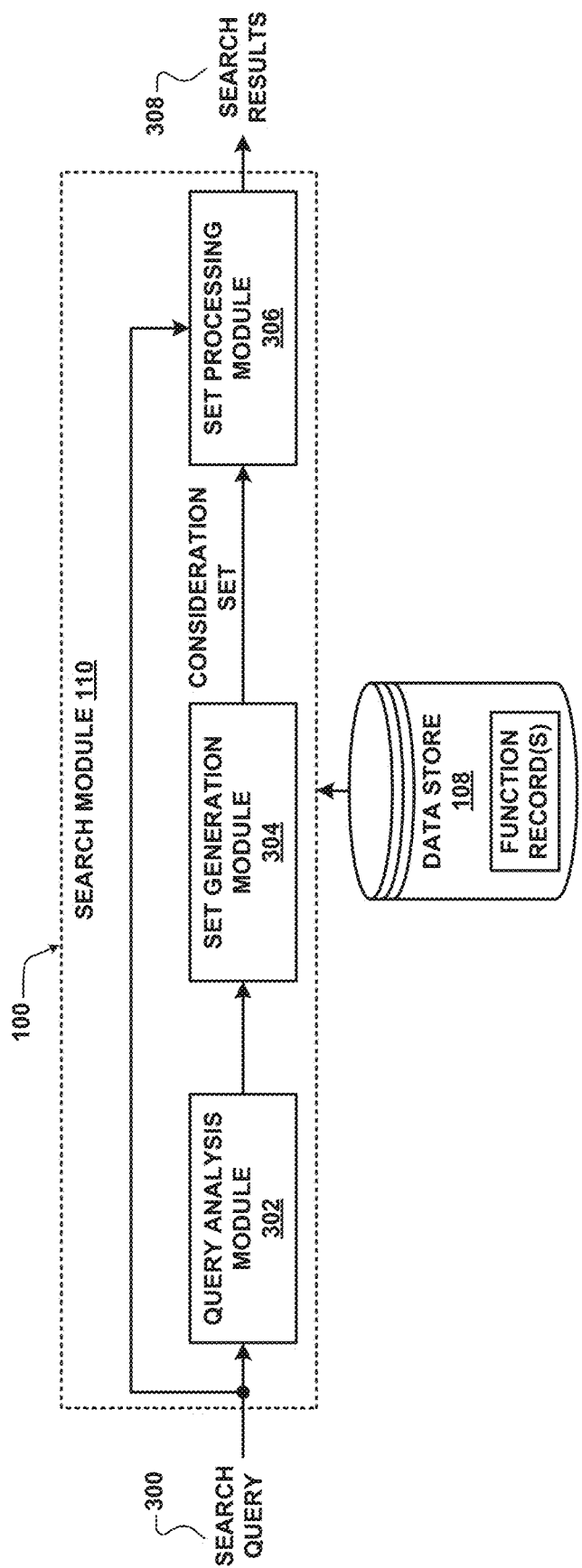
FIG. 3 is a functional block diagram of an example search module of a search system.

FIGS. 3-4 show examples of the search module 110 and the data store 108 of FIG. 1 and an example function record 400 that may be included in the search system 100 of the present disclosure. The search system 100 (e.g., the search module 110) of FIG. 3 may be configured to communicate with searching devices 112 and performing devices 114 via a network (e.g., the network 106). In some examples, the searching devices 112 and the performing devices 114 may communicate with the search system 100 via a partner computing system (an intermediate computing device; not shown). The partner computing system may be a computing system of a third party that may leverage the search functionality of the search system 100. The partner computing system may belong to a company or organization other than that which operates the search system 100. Example third parties which may leverage the functionality of the search system 100 may include, but are not limited to, internet search providers and wireless communications service providers. The searching devices 112 and the performing devices 114 may send search queries to the search system 100 and receive search results via the partner computing system. The partner computing system may provide a user interface to the searching devices 112 and the performing devices 114 in some examples and/or modify the search experience provided on the searching devices 112 and the performing devices 114.

As shown in FIG. 3, the search system 100 is configured to receive a search query 300 from a searching device 112 and one or more of first data corresponding to the searching device 112 and second data corresponding to a performing device 114. The search system 100 is configured to perform a search for function records included in the data store 108 based on the received search query 300. As described herein, the search system 100 may receive the search query 300 generated by the searching device 112 via a performing device 114 in some examples (e.g., as described with reference to FIG. 9A). As also described, the search system 100 may receive the first data from the searching device 112 and the second data from the performing device 114.

As also shown in FIG. 3, the search system 100 generates search results 308 including one or more result objects. For example, the search system 100 may generate the result objects based on data included in function records identified during the search and based on the first and/or second data, as described herein. For instance, the search system 100 may generate a single result object based on data included in a single identified function record. The data store 108 may include one or more function records some or all of which may be identified during the search of the data store 108. Information that may be included in a function record is described with respect to FIG. 4. The data store 108 may include one or more databases, indices (e.g., inverted indices), tables, files, or other data structures which may be used to implement the techniques of the present disclosure. For example, the data included in the function records may be included in one or more databases, indices (e.g., inverted indices), tables, files, or other data structures. The search module 110 receives the search query 300 and generates the search results 308 (e.g., the result objects) based on data included in the data store 108, the received search query 300, and the first and/or second data, as described herein.

The search system 100 performs a search for function records included in the data store 108 in response to the received search query 300 and/or additional data included in a query wrapper that includes the search query 300. The search system 100 generates the search results 308 (e.g., the result objects) based on the function records identified during the search. In some examples, the search system 100 generates result scores for the result objects, which may be used to rank the result objects and the search results 308 (e.g., the displayed results). The search system 100 may transmit the result scores to the searching device 112 with the result Objects so that the searching device 112 may rank the displayed results using the result scores.

The search system 100 transmits the result Objects to the searching device 112. The searching device 112 generates displayed results based on data included in the result objects. For example, the searching device 112 may generate a single displayed result for each received result object. In some examples, the searching device 112 may display only a single displayed result. For example, if the searching device 112 has a limited amount of display space, the searching device 112 may generate a displayed result such that it fills the display of the searching device 112. In other examples, the searching device 112 may generate a list of displayed results on the display such that the user can view more than one displayed result at a time.

The searching device 112 may receive the search results 308 from the search system 100 that are responsive to the search query 300 transmitted to the search system 100. The searching device 112 may be running a search application including a GUI that displays the search results 308 received from the search system 100. For example, the search application used to transmit the search query 300 to the search system 100 may also display the received search results 308 to the user.

The GUI of the search application running on the searching device 112 may display the search results 308 to the user in a variety of different ways, depending on what information is transmitted to the searching device 112. In some examples, the GUI may display the search results 308 to the user as a list of displayed results that are ranked based on result scores. The displayed results may be arranged under the search field into which the user entered the search query 300. The searching device 112 may arrange the displayed results in order by result scores associated with the displayed results. In some examples, the searching device 112 may group the displayed results together if they are related to the same native application.

The search system 100 may communicate with one or more different data sources (not shown), such as the data source(s) 104 of FIG. 1. With reference to the environment of FIG. 1, the data source(s) 104 may be sources of data which the search system 100 may use to generate and update the data store 108. For example, the search system 100 may use the data to update one or more databases, indices, tables, files, or other data structures included in the data store 108. The search system 100 may generate new function records and update existing function records based on data retrieved from the data source(s) 104. Although not shown, the search system 100 may include modules that generate new function records and update existing function records based on the data retrieved from the data source(s) 104. In some examples, data included in the data store 108 may be manually generated by a human operator.

The data source(s) 104 may include a variety of different data providers. The data source(s) 104 may include data from application developers, such as application developers' websites and data feeds provided by developers. The data source(s) 104 may include operators of digital distribution platforms configured to distribute applications to searching devices 112 and performing devices 114. The data source(s) 104 may also include other websites, such as websites that include web logs (i.e., blogs), application review websites, or other websites including data related to applications. Additionally, the data source(s) 104 may include social networking sites, such as FACEBOOK® by Facebook Inc. (e.g., Facebook posts) and TWITTER® by Twitter Inc. (e.g., text from tweets). The data source(s) 104 may also include online databases that include data related to movies, television programs, music, and restaurants. The data source(s) 104 may also include additional types of data sources in addition to the data sources described above. Different data sources may have their own content and update rate.

The search system 100 retrieves data from one or more of the data source(s) 104. The data retrieved from the data source(s) 104 can include any type of data related to application functionality and/or application states. The search system 100 generates function records based on the data retrieved from the data source(s) 104. In some examples, some data included in the function records (e.g., ASI) may be manually generated by a human operator. The data included in the function records may be updated over time on that the search system 100 provides up-to-date search results 308.

As described above, the searching device 112, the performing device(s) 114, the intermediate computing devices (e.g., "intermediate devices"), the search system 100, and the data source(s) 104 may be in communication with one another via a network (e.g., the network 106). The network may include various types of networks, such as a wide area network (WAN) and/or the Internet. Although the network may include a tong range network (e.g., the Internet or WAN), in some implementations, the network may include a shorter range network, such as a local area network (a LAN, or a WLAN). In one embodiment, the network uses standard communications technologies and/or protocols. Thus, the network can include links using technologies such as Ethernet, Wireless Fidelity (Wi-Fi®) (e.g., 802.11), worldwide interoperability for microwave access (Wi-MAX), 3G, Long Term Evolution (LTE), digital subscriber line (DSL), asynchronous transfer mode (ATM), InfiniBand, PCI Express Advanced Switching, etc. Similarly, the networking protocols used on the network can include multi protocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In other examples, the network can use custom and/or dedicated data communications technologies instead of, or in addition to, the ones described above.

The search module 110 includes a query analysis module 302, a consideration set generation module 304 (hereinafter, "set generation module 304"), and a consideration set processing module 306 (hereinafter, "set processing module 306"). The query analysis module 302, the set generation module 304, and the set processing module 306 may be embodied in computer-executable instructions stored in one or more memory components of the search system 100 and executed by one or more processing units of the search system 100. The query analysis module 302 receives a query wrapper including the search query 300. The query analysis module 302 analyzes the received search query 300. The set generation module 304 identifies a set of function records included in the data store 108 based on the received search query 300. The identified set of function records may be referred to herein as a "consideration set." The set processing module 306 processes (e.g., scores) the consideration set to generate a set of the search results 308 that include result objects generated based on selected function records of the consideration set.

Referring now to FIG. 4, the example function record 400 includes a function ID 402, ASI 404, one or more access mechanisms 406, and result object data 408. The access mechanism(s) 406 may include one or more native AAMs (hereinafter, "AAMs"), one or more WAMs, and/or one or more application download addresses. The set processing module 306 may generate a result object based on the result object data 408, the access mechanism(s) 406, and, in some examples, the function ID 402. The function record 400 may include data related to a function of a native application and/or a state of the native application resulting from performance of the function. The data store 108 may include one or more function records each having a structure that is similar to that of the function record 400.

In some implementations, a function record may include multiple different AAMs. For example, the different AAMs may be associated with different editions of a native application. A native application edition (hereinafter, "application edition") refers to a particular implementation or variation of a native application. For example, an application edition may refer to a version of a native application, such as a version 1.0 of the native application, or a version 2.0 of the native application. In another example, an application edition may refer to an implementation of a native application for a specific platform, such as a specific OS.

The different AAMs included in the function record may cause the corresponding application editions to launch and perform similar functions. Accordingly, the different AAMs included in the function record may cause the corresponding application editions to be set into similar application states. In one example, if the different AAMs reference different editions of an information retrieval application, the different AAMs may cause the corresponding application editions to retrieve similar information. In another example, if the different AAMs reference different editions of an internet music player application, the different AAMs may cause the corresponding application editions to play the same song.

In a specific example, a function record for a native application that retrieves restaurant information may include multiple different AAMs for multiple different application editions. Assuming that the function record is associated with a specific Mexican restaurant, the AAMs for the different application editions may cause each application edition to retrieve information for the same specific Mexican restaurant. For example, a first AAM may cause a first application edition (e.g., for a first OS) to retrieve information for the specific Mexican restaurant. A second AAM may cause a second application edition (e.g., for a second OS) to retrieve information for the specific Mexican restaurant, During some searches, the search system 100 may identify one or more function records that include multiple AAMs.

In some implementations, a function record may include a WAM. The WAM may be a resource identifier that can be processed by a wide variety of performing devices 114 running different operating systems. In some examples, the WAM may include a uniform resource locator (URL) (i.e., a web address) used with HTTP.

A WAM (e.g., a URL) included in a function record may be used by a web browser to access a web resource that includes similar information and/or performs similar functions as would be performed by a native application that receives an AAM of the function record. In one specific example, a WAM of a function record may direct a web browser of a performing device 114 to a web version of a native application referenced in one or more AAMs of the function record. For example, if one or more AAMs included in a function record for a specific Mexican restaurant cause each corresponding native application edition to retrieve information for the specific Mexican restaurant, a WAM included in the function record may direct a web browser of the performing device 114 to a web page entry for the specific Mexican restaurant, During some searches, the search system 100 may identify one or more function records that include one or more AAMs and a WAM.

In some examples, a function record may include one or more application download addresses. An application download address of a function record can be used by a user device 102 (e.g., a searching device 112 and/or a performing device 114) to download a native application referenced in one or more AAMs of the function record in the event that the native application is not installed on the user device 102. In some examples, the application download address may include a web address (e.g., a URL) at which the native application can be previewed and downloaded. For example, the application download address may direct a web browser of the user device 102 to a digital distribution platform that is configured to distribute native applications. Example digital distribution platforms include, but are not limited to, GOOGLE PLAY® developed by Google Inc., the APP STORE® developed by Apple Inc., and the WINDOWS PHONE STORE® developed by Microsoft Corporation. If the user device 102 includes a native download application for accessing a digital distribution platform, the application download address may direct the installed native download application to a site where the native application referenced in the AAM(s) of the function record can be downloaded.

The function ID 402 may be used to identify the function record 400 among the other function records included in the data store 108. The function ID 402 may be a string of alphabetic, numeric, and/or symbolic characters (e.g., punctuation marks) that uniquely identify the function record 400 in which the function ID 402 is included. In some examples, the function ID 402 may describe a function and/or an application state in human-readable form. For example, the function ID 402 may include a name of a native application referenced in an AAM included in the access mechanism(s) 406. Additionally, or alternatively, the function ID 402 may be a human-readable string that describes a function performed according to the access mechanism(s) 406 and/or an application state resulting from performance of the function according to the access mechanism(s) 406. In some examples, the function ID 402 may include a string in the format of a URI, of a WAM for the function record 400, which may uniquely identify the function record 400.

In a more specific example, if the function record 400 describes a function of a native application YELP® by Yelp Inc. (hereinafter, "Yelp"), the function ID 402 may include the name "Yelp" along with a description of an application state corresponding to the function, e.g., as described in the ASI 404. In an example where the function record 400 describes an entry within Yelp for the restaurant THE FRENCH LAUNDRY®, the function ID 402 may be "Yelp—The French Laundry." In an example where the function ID 402 includes a string in the format of a URL, the function ID 402 may include the string "www.yelp.com/biz/the-french-laundry-yountvilie-2?ob=1" to uniquely identify the function record 400.

The ASI 404 may include data that describes an application state into which a native application is set according to an AAM included in the function record 400 (e.g., in the access mechanism(s) 406). Additionally, or alternatively, the ASI 404 may include data that describes a function performed according to the access mechanism(s) 406. The ASI 404 may include a variety of different types of data. For example, the ASI 404 may include structured, semi-structured, and/or unstructured data. The ASI 404 may be extracted or inferred from documents retrieved from the data source(s) 104 described above. In some examples, the ASI 404 may include data that is manually generated. The ASI 404 may also be updated so that up-to-date search results 308 can be provided in response to a user's search query 300.

In some examples, the ASI 404 may include data that may be presented to a user when a native application referenced by an AAM included in the function record 400 (e.g., included in the access mechanism(s) 406) is in an application state defined by the AAM. For example, the ASI 404 may include data that describes the application state of the native application after a performing device 114 has performed one or more operations indicated by the AAM to set the native application into the application state. In one example, if the function record 400 is associated with a shopping application, the ASI 404 may include data that describes products (e.g., names and prices) that are shown when the shopping application is set into an application state defined by the access mechanism(s) 406 of the function record 400. In another example, if the function record 400 is associated with a music player application, the ASI 404 may include data that describes a song (e.g., a song name and an artist name) that is played when the music player application is set into an application state defined by the access mechanism(s) 406 of the function record 400.

The types of data included in the ASI 404 may depend on the type of information associated with the application state and the functionality defined by the access mechanism(s) 406. In one example, if the function record 400 is for a native application that provides reviews of restaurants, the ASI 404 may include information (e.g., text and numbers) related to a restaurant, such as a category of the restaurant, reviews of the restaurant, and a menu for the restaurant. In this example, the access mechanism(s) 406 may cause the native application to launch and retrieve information for the restaurant. As another example, if the function record 400 is for a native application that plays music, the ASI 404 may include information related to a song, such as a name of the song, an artist name, lyrics, and listener reviews for the song. In this example, the access mechanism(s) 406 may cause the native application to launch and play the song described in the ASI 404.

An AAM (e.g., included in the access mechanism(s) 406 may include an ARI and/or one or more operations for a performing device 114 to perform. For example, the ARI may be a string having an application specific scheme. The ARI may include a reference to a native application and indicate one or more operations for a performing device 114 (e.g., the native application) to perform. For example, the ARI may include the reference to the native application, a domain name, and a path to be used by the native application to retrieve and display information to a user.

An example ARI for the native application OPENTABLE® by OpenTable Inc. (hereinafter, "OpenTable") on the ANDROID® OS is "vnd.opentable.deeplink://opentable.com/restaurant/profile?rid=88333&refid=1." A portion of the example ARI references OpenTable. For example, the substring "vnd.opentable.deeplink" of the ARI references OpenTable. The example ARI also indicates one or more operations for OpenTable to perform. For example, OpenTable may retrieve and display the information included in the API domain and path defined by the substring "opentable.com/restaurant/profile?rid=88333&refid=1." In response to receiving the ARI, a performing device may launch OpenTable and display information retrieved from the location indicated by the ARI. The ARI may be provided by the developer of OpenTable in some examples.

In some examples, the AAM may include operations for the performing device to perform in addition to the one or more operations indicated by the ARI. For example, an OS of the performing device 114 and/or a native application installed on the performing device 114 may perform these additional operations included in the AAM in order to set a native application into an application state specified by the AAM. In some examples, the operations may be included in a script. Examples of the operations may include, but are not limited to, launching a native application, waiting for the native application to start, creating and sending a search request to a server, setting a current geo-location in a native application, making a restaurant reservation, sending a text message, and adding an appointment to a calendar. In some examples, an AAM may not include an ARI, Instead, the AAM can include other operations that reference a native application. The operations may be performed by a performing device 114. In some examples, the operations may be included in a script.

Referring back to FIG. 3, the search query 300 received by the search module 110 is used to perform a search of the data store 108. The query analysis module 302 receives the search query 300. The query analysis module 302 may perform various analysis operations on the received search query 300. For example, the analysis operations performed by the query analysis module 302 may include, but are not limited to, tokenization of the search query 300, filtering of the search query 300, stemming, synonymization, and stop word removal.

The set generation module 304 identifies a set of function records (i.e., the consideration set) based on the search query 300. In some examples, the set generation module 304 may identify the set of function records based on one or more matches between one or more terms of the search query 300 and one or more terms included in the function records. For example, the set generation module 304 may identify the set of function records in the data store 108 based on one or more matches between one or more tokens generated by the query analysis module 302 and one or more words included in the function records of the set, such as words included in the ASI and/or function Ds of the function records. In some examples, the consideration set may include one or more function IDs of the identified function records used to identify the function records, rather than the function records themselves. As a result, the consideration set may include less data and/or require fewer processing and/or storage resources compared to techniques where the consideration set includes one or more function records.

The set processing module 306 processes the consideration set to generate a set of search results 308 that includes one or more result objects. Each result object may include any of the data described above as being included in a result object. In some examples, the set processing module 306 scores the functions records included in the consideration set. The scores associated with the function records of the consideration set may be referred to as "result scores," Accordingly, in some examples, each of the function records included in the consideration set may have a corresponding result score. The set processing module 306 may then select one or more function records from the consideration set based on the result scores associated with the function records. For example, the set processing module 306 may select one or more highest-scoring function records of the consideration set.

The set processing module 306 then generates one or more result objects based on the selected function records. For example, the set processing module 306 may generate a single result object based on a single function record. The set processing module 306 transmits the result objects to the searching device 112 that generated the search query 300. The set processing module 306 may also transmit the result scores associated with the result objects (i.e., with the function records used to generate the result objects) to the searching device 112.

The information conveyed by the search results 308 may depend on how the result scores are calculated by the set processing module 306. For example, the result scores may indicate the relevance of an application function or application state to the search query 300, the popularity of an application function or application state, or other properties of the application function or application state, depending on what parameters the set processing module 306 uses to score the function records of the consideration set.

The set processing module 306 may generate result scores for function records in a variety of different ways. In some implementations, the set processing module 306 generates a result score for a function record based on one or more scoring features. The scoring features may be associated with the function record and/or the search query 300. A function record scoring feature (hereinafter, a "record scoring feature") may be based on any data associated with a function record. For example, record scoring features may be based on any data included ASI of a function record. A query scoring feature may include any data associated with the search query 300. For example, query scoring features may include, but are not limited to, a number of words in the search query 300, the popularity of the search query 300, and the expected frequency of the words in the search query 300. A record-query scoring feature may include any data which may be generated based on data associated with both a function record and the search query 300 that resulted in identification of the function record by the set processing module 306. For example, record-query scoring features may include, but are not limited to, parameters that indicate how well terms of the search query 300 match terms of ASI of an identified function record. In some examples, determining such record-query scoring features, i.e., parameters that indicate how well terms of a search query 300 match terms of ASI of an identified function record, may be performed using Lucene® information retrieval software developed by the Apache Software Foundation. The set processing module 306 may generate a result score for a function record based on at least one of the record scoring features, the query scoring features, and the record-query scoring features.

The set processing module 306 may determine a result score for a function record included in the consideration set based on one or more of the scoring features listed herein and/or additional scoring features not explicitly listed. In some examples, the set processing module 306 may include one or more machine-learned models (e.g., a supervised learning model) configured to receive one or more scoring features. The one or more machine-learned models may generate result scores for function records included in the consideration set based on at least one of the record scoring features, the query scoring features, and the record-query scoring features. For example, the set processing module 306 may pair the search query 300 with each function record included in the consideration set and calculate a vector of features for each (query, record) pair. The vector of features may include one or more record scoring features, one or more query scoring features, and one or more record-query scoring features. The set processing module 306 may then input the vector of features into a machine-learned regression model to calculate a result score for the corresponding function record. In some examples, the machine-learned regression model may include a set of decision trees (e.g., gradient boosted decision trees). In other examples, the machine-learned regression model may include a logistic probability formula. In some examples, the machine-learned task described above can be framed as a semi-supervised learning task, where a minority of the training data is labeled with human-curated scores, and the rest of the training data is used without human labels. The result scores associated with the function records of the consideration set may be used in a variety of different ways described herein.

FIGS. 5A-5D show example GUIs displayed on a searching device 500 according to the present disclosure. The searching device 500 shown in FIGS. 5A-5D is a wrist watch computing device (e.g., a smart watch) including watch straps 502. Example wrist watch computing devices include the SAMSUNG GALAXY GEAR®, the SAMSUNG GALAXY GEAR® 2, the SAMSUNG GEAR® 2 Neo, and the SAMSUNG GEAR FIT® developed by Samsung Electronics Co., Ltd., as well as the APPLE WATCH® developed by Apple Inc.

Referring now to FIG. 5A, the searching device 500 executes a search application including a GUI 504 that displays a search field 506 for receiving search queries 300 from a user. Since the searching device 500 has a small form factor (e.g., a small screen), the searching device 500 may not include a full keyboard in some examples. Accordingly, the searching device 500 may receive search queries 300 in a different manner, such as using voice input. For example, the user may tap the search field 506 and speak into the searching device 500 in order to enter a search query 300 into the search field 506. The searching device 500 may then transmit the entered search query 300 to the search system 100. In some examples, the searching device 500 may automatically transmit the search query 300 after it has been received by the searching device 500. In other examples, the user may press a search button 508 also displayed by the GUI 504 in order to transmit the search query 300 to the search system 100.

In the example of FIG. 5A, the user has entered the search query "Steak" 300 into the search field 506 displayed by the GUI 504 of the searching device 500. The searching device 500 has subsequently transmitted the search query 300 to the search system 100. The search system 100 has generated search results 308 in response to the search query "Steak" 300. As shown in FIGS. 5B-5D, respectively, the search results 308 are associated with a mapping native application, a phone native application, and the OpenTable native application. Each of the search results 308 (e.g., each of the result objects included in the search results 308) may be transmitted to the searching device 500 at the same time. Accordingly, although only a single displayed result is shown at one time on the searching device 500 in each of FIGS. 5B-5D, the search results 308 that are not displayed may be stored in the memory of the searching device 500. The user may interact with the searching device 500 (e.g., swipe a screen of the searching device 500, or use a physical button on the searching device 500) in order to browse through the different displayed results. For example, the user may swipe from left to right to advance through the displayed results. The user may then swipe from right to left to back up, or move in an opposite direction, through the displayed results.

FIG. 5B shows an example displayed result 510 for a mapping native application. The displayed result 510 indicates to the user that selecting the displayed result 510 wilt result in a performing device 114 opening the mapping native application and navigating the user to the restaurant ALEXANDER'S STEAKHOUSE® by Alexander's Steakhouse Inc. (hereinafter, "Alexander's Steakhouse") that is located 5 miles away from the user's current location. The user may tap the displayed result 510 shown in FIG. 5B in order to select the displayed result 510. For example, the user may tap the user input graphic that includes the string "Navigate" in order to select the displayed result 510. In some examples, the displayed result 510 may be selected by tapping anywhere on the display of the searching device 500. In still other examples, the displayed result 510 may be selected by using a mechanical button of the searching device 500. The user may interact with (e.g., swipe the display of) the searching device 500 to introduce another displayed result to the display and remove the displayed result 510 of FIG. 5B from the display.

FIG. 5C shows an example displayed result 512 for a phone native application. The displayed result 512 indicates to the user that selecting the displayed result 512 will result in a performing device 114 (e.g., a smart phone, or a car phone located near the user) opening the phone native application and setting it into a state for calling Alexander's Steakhouse. The user may tap the displayed result 512 shown in FIG. 5C in order to select the displayed result 512. For example, the user may tap the user input graphic that includes the string "Call" in order to select the displayed result 512. In some examples, the displayed result 512 may be selected by tapping anywhere on the display of the searching device 500 or using a mechanical button of the searching device 500. The user may interact with (e.g., swipe the display of) the searching device 500 to introduce another displayed result to the display and remove the displayed result 512 of FIG. 5C from the display. The user may also swipe the display to bring the displayed result 510 of FIG. 5B back on the display.

FIG. 5D shows an example displayed result 514 for OpenTable, which is a restaurant reservation application. The displayed result 514 indicates to the user that selecting the displayed result 514 will result in a performing device 114 opening the OpenTable application (e.g., the native application edition or a web-based application edition of the OpenTable application) to an entry for reserving a table at the "Osso Steakhouse." The user may tap the displayed result 514 shown in FIG. 5D in order to select the displayed result 514. For example, the user may tap the user input graphic that includes the string "Reserve Table" in order to select the displayed result 514. In some examples, the displayed result 514 may be selected by tapping anywhere on the display of the searching device 500 or using a mechanical button of the searching device 500. The user may interact with (e.g., swipe the display of) the searching device 500 to introduce another displayed result to the display and remove the displayed result 514 of FIG. 5D from the display. The user may also swipe the display one or more times to bring the displayed results 510, 512 of FIGS. 5B and 5C back on the display.

In the examples of FIGS. 5A-5D described above, the search system 100 may have generated the search results 308 in response to the search query 300 such that the search results 308 include formatting data. In these examples, the formatting data may indicate to the searching device 500 how to render one or more of the search results 308 as displayed results on the searching device 500. In other words, the formatting data may specify to the searching device 500 how to display one or more of the displayed results 510, 512, and 514 (e.g., specify the content, dimensions, and relative positions of the various GUI elements included in the displayed results 510, 512, and 514). Additionally, or alternatively, the formatting data may define one or more UI elements and/or real-time data elements to be included in one or more of the displayed results 510, 512, and 514. In these examples, the search system 100 may have generated the formatting data based on received first data that describes the searching device 500, as described herein.

FIG. 6 shows another example GUI displayed on a searching device 600 according to the present disclosure. Specifically, FIG. 6 shows an example GUI of a search application running on the searching device 600. In FIG. 6, a user has entered a search query 300 ("Late night diners by me") into the GUI of the search application (i.e., into a search field 602 of the GUI). The user has interacted with the GUI in order to transmit a query wrapper including the search query 300 to the search system 100. For example, the user may have caused the searching device 600 to transmit the query wrapper to the search system 100 by selecting (e.g., touching, or clicking) a search button 604 of the GUI. The search system 100 has identified function records and has generated result Objects including AAMs, WAMs, and application download addresses selected from the identified function records, as described above. In the example of FIG. 6, the search system 100 has identified function records including references to the native applications Yelp. TRIPADVISOR® by TripAdvisor, LLC (hereinafter, "TripAdvisor"), OpenTable, and URBANSPOON® by Wanderspot LLC (hereinafter, "Urbanspoon").

The GUI of FIG. 6 shows different types of displayed results 608-1, 608-2, 610, 612, and 614 for the function records identified for Yelp. TripAdvisor, OpenTable, and Urbanspoon. As shown in FIG. 6, the displayed results 608-1, 608-2, 610, 612, and 614 are displayed on the searching device 600 at the same time, e.g., because the searching device 600 has a sufficiently large form factor (e.g., a sufficiently large screen). In the example of FIG. 6, the search system 100 has identified function records that correspond to entries in Yelp for "IHOP" and "Denny's," the displayed results for which are included in the GUI. Specifically, the displayed results 608-1 and 608-2 of the GUI include AAMs that launch Yelp and retrieve the entries in Yelp for "IHOP" and "Denny's," respectively, on a performing device 114 (not shown). As shown in the GUI of FIG. 6, the displayed results 608-1 and 608-2 are grouped together under a Yelp header 606 also included in the GUI. In other examples, displayed results for different native applications may be mixed instead of grouped.

The displayed results 610 and 614 may be associated with AAMs for TripAdvisor and Urbanspoon, respectively. For example, an AAM included in the displayed result 610 may cause a performing device 114 to launch TripAdvisor to a default state. Similarly, an AAM included in the displayed result 614 may cause a performing device 114 to launch Urbanspoon to a default state.

The displayed result 612 may include a WAM for a web-based application version of OpenTable. For example, the WAM may direct a web browser of a performing device 114 to one or more late night diners on the OpenTable web-based application. Accordingly, in response to selection of the displayed result 612, the performing device 114 may launch the web browser and retrieve information at a web address included in the WAM.

In the example of FIG. 6 described above, the search system 100 may have generated the search results 308 used by the searching device 600 to generate the displayed results 608-1, 608-2, 610, 612, and 614 in response to the search query 300 such that the search results 308 include formatting data. In this example, the formatting data may indicate to the searching device 600 how to render the search results 308 as the displayed results 608-1, 608-2, 610, 612, and 614 on the searching device 600. In other words, the formatting data may specify to the searching device 600 the content, dimensions, and relative positions of the displayed results 608-1, 608-2, 610, 612, and 614, as shown in FIG. 6. Additionally, or alternatively, the formatting data may define one or more UI elements and/or real-time data elements to be included in one or more of the displayed results 608-1, 608-2, 610, 612, and 614. In these examples, the search system 100 may have generated the formatting data based on received first data that describes the searching device 600, as described herein.

FIGS. 7A-7C show example GUIs displayed on a searching device 700 and a performing device 712 according to the present disclosure, in the example of FIGS. 7A-7C, the searching device 700 is a wrist watch computing device (e.g., a smart watch) including watch straps 702 and the performing device 712 is a vehicle navigation system. FIG. 7A shows that a user has entered a search query "Papa Johns" 300 into a search field 706 of a GUI 704 displayed on the searching device 700 in order to find search results 308 related to Papa John's® restaurants by Papa John's International, Inc. In this example, the user may have pressed a search button 708 of the GUI 704 to transmit the search query 300 to the search system 100. A single displayed result 710 generated using the search results 308 received from the search system 100 in response to the search query 300 is shown in FIG. 7B. The displayed result 710 of FIG. 7B shows that displayed results may include user inputs (e.g., a "Navigate Car" button) for selecting outcomes at performing devices 114 from the searching device 700. For example, the user selecting the "Navigate (Car)" button shown in FIG. 7B may cause a performing device 114 installed in the user's car (e.g., a vehicle navigation system) to open a navigation native application and generate a route to the nearest "Papa John's®" restaurant. Alternatively, the user selecting a "Call (Phone)" button (not shown) may cause a performing device 114 (e.g., the user's smart phone) to launch a phone native application and set the application into astute that includes and/or dials the number for the nearest "Papa John's®" restaurant. The displayed result 710 shown in FIG. 7B also shows how displayed results may generate an indication of which performing device 114 will be performing a particular function associated with a given displayed result (e.g., a function associated with a specific button of the displayed result). For example, the displayed result 710 of FIG. 7B indicates that a specific performing device 114 (e.g., a computing device installed in the user's car) will perform the above-described navigation function. In other examples, the displayed result 710 may indicate that a different performing device 114 (e.g., a smart phone) will perform the "Call" function also described above.

As described herein, in some examples, the searching device 700 may automatically pick a performing device 114 for performing a function associated with a displayed result on the searching device 700 (e.g., upon the user selecting the displayed result). In other examples (e.g., FIG. 7B), the searching device 700 may indicate to the user which computing device will be used as the performing device 114 to perform the function. In still other examples, selection of the performing device 114 may be done in a different manner. In some examples, the name of the native application (e.g., "OpenTable") that will be launched when the user selects a displayed result may be displayed in the displayed result. In other examples, the displayed results may not include names of one or more specific native applications, but may instead refer to functionality (e.g., "call," "navigate," etc.) of each displayed result in a more general manner.

FIG. 7C shows the example performing device 712 that has received an indication from the searching device 700 that the user has selected the "Navigate (Car)" button of the displayed result 710 shown in FIG. 7B. The performing device 712 shown in FIG. 7C is a vehicle navigation system. As shown in FIG. 7C, the vehicle navigation system (i.e., the performing device 712) has launched a navigation native application in response to receiving the indication from the searching device 700. As depicted in FIG. 7C, the navigation native application is providing directions to a nearby "Papa John's®" restaurant.

In the examples of FIGS. 7A-7C described above, the search system 100 may have generated the search results 308 in response to the search query 300 such that the search results 308 include formatting data. In these examples, the formatting data may indicate to the searching device 700 how to render one or more of the search results 308 as displayed results on the searching device 700. In other words, the formatting data may specify to the searching device 700 how to display the displayed result 710 (e.g., specify the content, dimensions, and relative positions of the various GUI elements included in the displayed result 710). Additionally, or alternatively, the formatting data may define one or more UI elements and/or real-time data elements to be included in the displayed result 710. In these examples, the search system 100 may have generated the formatting data based on received first data that describes the searching device 700, as described herein.

In other examples, the search system 100 may have generated the search results 308 in response to the search query 300 such that the search results 308 include an access mechanism (e.g., an AAM, a \YAM, and/or an application download address) that is compatible with the performing device 712, as also described herein. In these examples, the search system 100 may have selected the access mechanism (e.g., from among multiple different access mechanisms included in a function record) based on received second data that describes the performing device 712, as also described herein. In still other examples, the search system 100 may have generated the search results 308 in response to the search query 300 such that the search results 308 include interface data. In these examples, the interface data may specify how (e.g., via which communication interface, system, or device and/or using which data type or format) the searching device 700 indicates to the performing device 712 that the user has selected the displayed result 710 on the searching device 700 (e.g., the "Navigate (Car)" button of the displayed result 710), as further described herein. In other examples, the search system 100 may have generated the search results 308 in response to the search query 300 such that the search results 308 include performing device selection data. In these examples, the performing device selection data may cause the searching device 700 to select the performing device 712, e.g., from among multiple different performing devices 114, as also described herein.

FIGS. 8A-13 are functional block diagrams that show different arrangements of searching devices 112, performing devices 114, other computing devices, and the search system 100. Specifically, FIGS. 8A-13 show various different communication interfaces used to transfer data among the searching device 112, the performing device(s) 114, and the search system 100 of the present disclosure, as well as various different arrangements thereof. In this manner, the examples of FIGS. 8A-13 depict a number of techniques by which the searching device 112, the performing device(s) 114, and the search system 100 may communicate to one another search queries 300, search results 308, indications of user selections of displayed results, formatting data, specifically selected access mechanisms, interface data, and performing device selection data, as described herein. The different arrangements are now described.

FIGS. 8A-8B show examples in which a searching device 800, 804 and a performing device 802, 806 each have independent network access (i.e., via the network 106) to the search system 100. Put another way, the searching device 800, 804 is not tethered to the performing device 802, 806 in FIGS. 8A-8B. For example, with reference to FIG. 8A, the searching device 800 may communicate with the search system 100 using a Wi-Fi® connection, a cellular network connection, or other communication technology. The performing device 802 may also communicate with the search system 100 using a Wi-Fi® connection, a cellular network connection, or other communication technology. In some examples, the searching device 800 and the performing device 802 may communicate with the search system 100 using different communication technologies. In other examples, the searching device 800 and the performing device 802 may communicate with the search system 100 using the same communication technology. In some examples, the searching device 800 and the performing device 802 may be connected to the search system 100 through the same computing network (e.g., a home network, or a business network).

In some examples, the searching device 800 may transmit an indication (e.g., an indication that a user has selected a displayed result) to the performing device 802 via the network 106, as shown in in the example of FIG. 8A. In other examples, the searching device 800 and the performing device 802 may communicate directly with one another, such as through a Bluetooth® connection, or other direct connection. In these examples, the searching device 800 may transmit the indication to the performing device 802 via the direct connection.

FIG. 8B shows an example searching device 804 and an example performing device 806. The searching device 804 is a wrist watch computing device (e.g., a smart watch). The performing device 806 is a smart phone computing device. The searching device 804 and the performing device 806 may independently communicate with the search system 100. In some examples, the searching device 804 may directly communicate with the performing device 806 (e.g., via a Bluetooth® connection).

FIGS. 9A-11 show example arrangements of computing devices in which a searching device 900, 904, 1000 is tethered to another computing device in order to communicate with the search system 100 (i.e., via the network 106). In FIG. 9A, the searching device 900 is tethered to a performing device 902. In this example, the searching device 900 may transmit search queries 300 to the search system 100 and receive search results 308 from the search system 100 via the performing device 902. The searching device 900 may be tethered to the performing device 902 because the searching device 900 may not have sufficient communication technology for communicating via the Internet with the search system 100. For example, the searching device 900 may have a communication technology (e.g., Bluetooth®) that cannot connect to the Internet at the searching device's 900 current location. In FIG. 9A, the searching device 900 may communicate directly with the performing device 902 via the tether. For example, if the searching device 900 is connected to the performing device 902 via a Bluetooth® connection, the searching device 900 may transmit an indication of a user selection of a displayed result to the performing device 902 using the Bluetooth® connection.

Figure 9B:
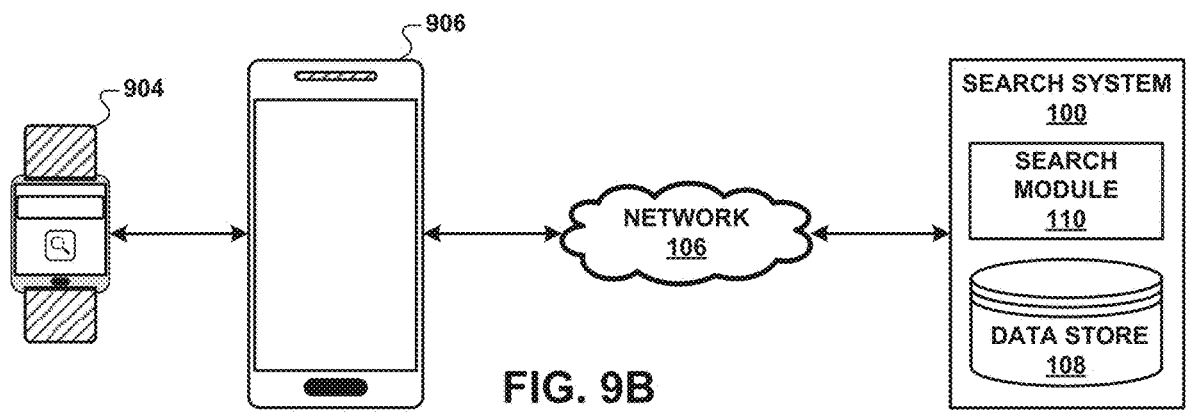

FIG. 9B shows an example searching device 904 and an example performing device 906. The example searching device 904 is a wrist watch computing device (e.g., a smart watch). The example performing device 906 is a smart phone computing device. In the example of FIG. 9B, the wrist watch computing device (i.e., the searching device 904) is tethered to the smart phone computing device (i.e., the performing device 906). Accordingly, the wrist watch computing device communicates with the search system 100 via the smart phone computing device. The wrist watch computing device may be used by a user of the wrist watch computing device to view and select search results 308 (i.e., displayed results). The smart phone computing device may perform functions indicated by one or more displayed results that have been selected by the user on the wrist watch computing device.

In other examples (not shown), the performing device 902, 906 may be tethered to the searching device 900, 904 such that the searching device 900, 904 transmits search queries 300 directly to the search system 100, receives search results 308 directly from the search system 100, and transmits indications of user selections of displayed results to the performing device 902 directly via the tether. In other words, in these examples, the arrangement of the searching and performing devices 900, 902, 904, 906 with respect to the search system 100 as shown in FIGS. 9A-9B may be reversed.

Figure 10:
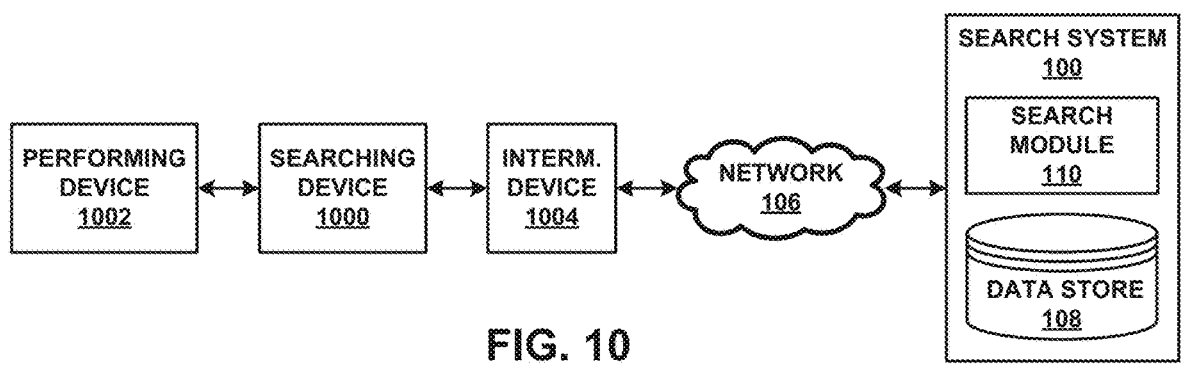
FIGS. 10-11 are schematic views of example arrangements of a searching device, a performing device, and an intermediate device in communication with a search system via a network.

FIG. 10 shows another example arrangement of computing devices in which the searching device 1000 is tethered to another computing device 1004, referred to herein as an "intermediate computing device," or an "intermediate device" 1004, in order to communicate with the search system 100. Accordingly, the searching device 1000 may communicate with the search system 100 (e.g., transmit search queries 300 and/or receive search results 308) via the intermediate device 1004. As described herein, the searching device 1000 indicates selected results to a performing device 1002, which is a different computing device than the intermediate device 1004. In some examples, the searching device 1000 may indicate a selected result to the performing device 1002 via a direct connection (e.g., as shown in FIG. 10). In other examples, the searching device 1000 may communicate with the performing device 1002 to indicate a selected result via the Internet (e.g., in examples where the performing device 1002 is not tethered to the searching device 1000).

Figure 11:
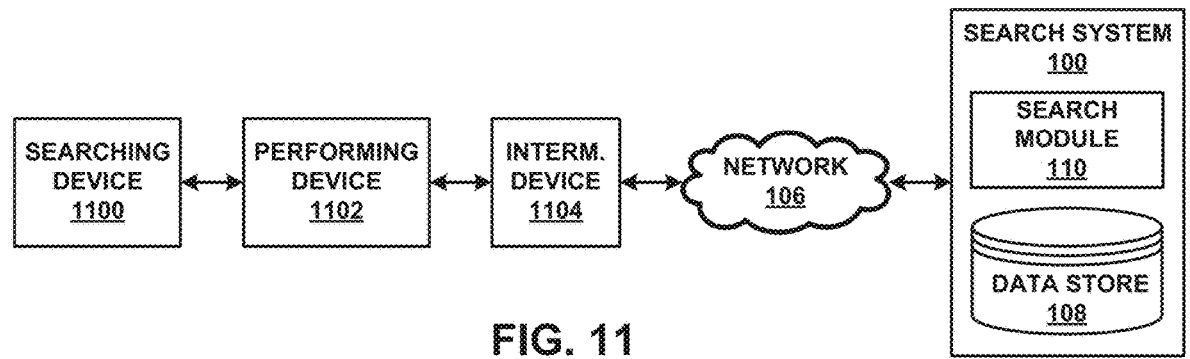

FIG. 11 shows another example arrangement of computing devices in which a searching device 1100 is tethered to an intermediate device 1104 via a performing device 1102 in order to communicate with the search system 100. Accordingly, the searching device 1100 may communicate with the search system 100 (e.g., transmit search queries 300 and/or receive search results 308) via the performing device 1102 and the intermediate device 1104. As described herein, the searching device 1100 indicates selected results to the performing device 1102. In some examples, the searching device 1100 may indicate a selected result to the performing device 1102 via a direct connection (e.g., as shown in FIG. 11). In other examples, the searching device 1100 may communicate with the performing device 1102 to indicate a selected result via the Internet.

Figure 12:
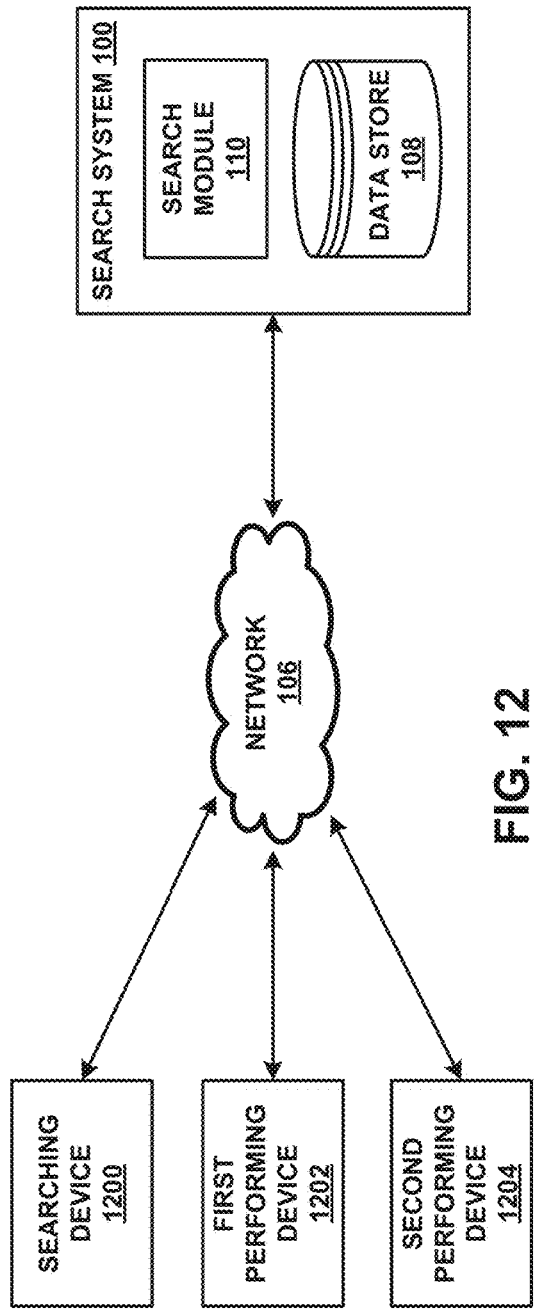
FIG. 12 is a schematic of an example arrangement of a searching device and multiple performing devices in communication with a search system via a network.
Figure 13:
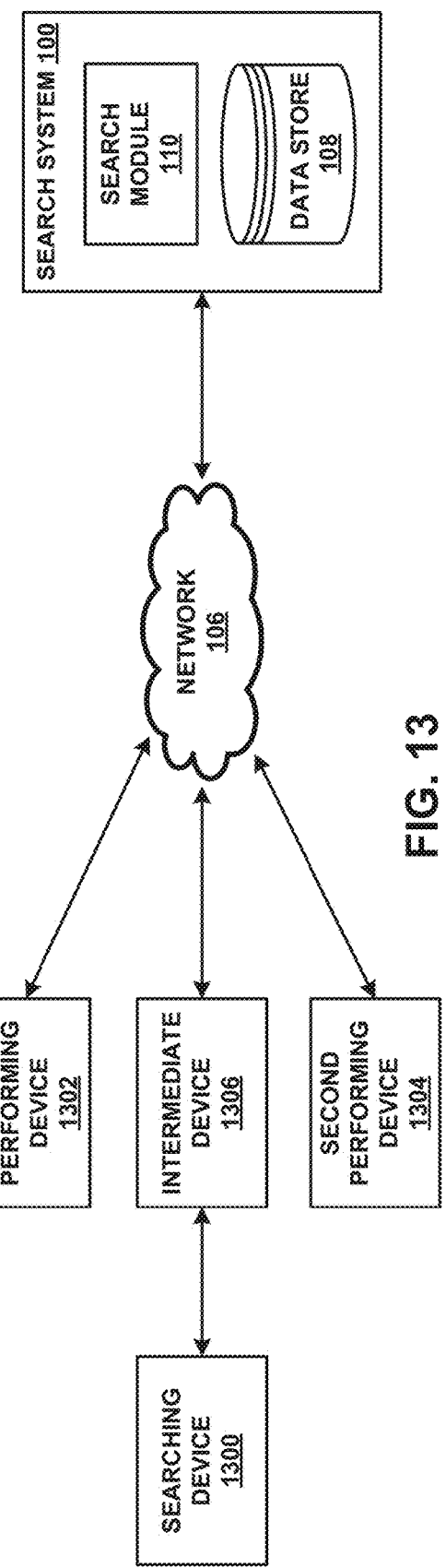
FIG. 13 is a schematic of an example arrangement of a searching device, an intermediate device, and multiple performing devices in communication with a search system via a network.

FIGS. 12-13 show how a searching device 112 may transmit indications of selected results to more than one performing device 114. With respect to FIG. 12, a searching device 1200 may indicate a selected result to a first performing device 1202 and/or a second performing device 1204. The performing device(s) (i.e., the one or more of the performing devices 1202, 1204) that receive the indication may then perform one or more functions indicated by, or associated with, the indication. The connections between the searching device 1200 and the first and second performing devices 1202, 1204 may be direct connections and/or connections through a network (e.g., the network 106), such as the Internet. In other examples (not shown), one or more of the first and second performing devices 1202, 1204 may be tethered to the searching device 1200. With respect to FIG. 13, a searching device 1300 is tethered to an intermediate device 1306 in order to communicate with the search system 100 (i.e., via the network 106). The searching device 1300 may indicate a selected result to a first performing device 1301 and/or a second performing device 1304. The performing device(s) (i.e., the one or more of the performing devices 1302, 1304) that receive the indication may then perform one or more functions specified by the indication. The connections between the searching device 1300 and the first and second performing devices 1302, 1304 may be direct connections and/or connections through a network, e.g., the network 106 (via the intermediate device 1306), such as the Internet. In other examples (not shown), one or more of the first and second performing devices 1302, 1304 may be tethered to the searching device 1300 and/or the intermediate device 1306. Additional arrangements of searching devices 112, performing devices 114, and intermediate devices are also contemplated herein view of the above-described examples.

Figure 14:
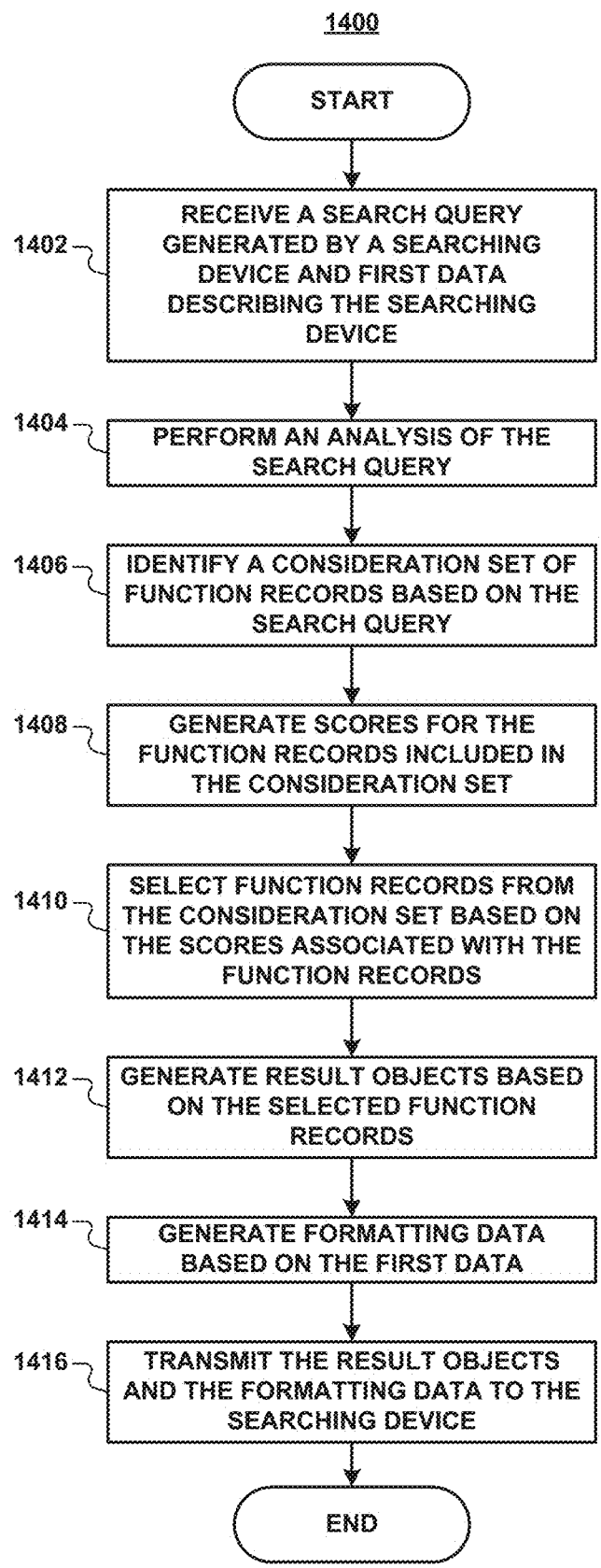
FIGS. 14-17 are flow diagrams of example methods for performing a search for function records based on a received search query and data corresponding to a device.

FIG. 14 is a flow diagram that shows an example method 1400 for generating search results 308 based on a received search query 300 and based on data corresponding to a device. The method 1400 is directed to generating search results 308 to include formatting data that indicates to a searching device 112 how to render each of one or more of the search results 308 as a displayed result on the searching device 112. The method 1400 is described with respect to the search module 110 of FIG. 3. In block 1402, the query analysis module 302 receives a search query 300 from (e.g., generated by) a searching device 112 and first data corresponding to the searching device 112. For example, the query analysis module 302 may receive the search query 300 and the first data from the searching device 112. In some examples, the query analysis module 302 may receive the search query 300 and the first data via a performing device 114 and/or another intermediate device. The searching device 112 may have received the search query 300 from a user of the searching device 112 (e.g., via a GUI of a search application executing on the searching device 112) and transmitted the search query 300 to the query analysis module 302 (i.e., to the search system 100). As explained herein, the first data may describe various attributes of the searching device 112, e.g., a display type, a display resolution, graphics processing and rendering capabilities, UI capabilities, and network connectivity associated with the searching device.

In block 1404, the query analysis module 302 performs an analysis of the search query 300. For example, the query analysis module 302 may perform any of tokenization, filtering, stemming, synonymization, and stop word removal with respect to the search query 300. In block 1406, the set generation module 304 identifies a consideration set of one or more function records included in the data store 108 based on the search query 300 (e.g., based on an output from the query analysis module 302). For example, the set generation module 304 may identify the function records of the consideration set based on one or more matches between one or more terms of the search query 300 and one or more terms included in ASI and/or a function ID of each function record.

In blocks 1408-1410, the set processing module 306 processes the consideration set of function records. For example, in block 1408, the set processing module 306 generates result scores for the function records included in the consideration set. In block 1410, the set processing module 306 selects one or more function records from the consideration set based on the result scores associated with the function records. For example, the set processing module 306 may select one or more function records having the highest (e.g., largest result scores. In block 1412, the set processing module 306 generates one or more result objects based on the selected function records.

In block 1414, the set processing module 306, or another module, generates formatting data based on the first data. In this example, the formatting data may indicate to the searching device 112 how to display one or more of the result Objects on the searching device 112. In other words, the formatting data may specify how the searching device 112 renders each of one or more of the result objects as a displayed result on the searching device 112. Additionally, or alternatively, the formatting data may define one or more elements and/or real-time data elements to be included in each of one or more of the result objects when the result object is displayed on the searching device 112.

In block 1416, the set processing module 306 transmits the result objects and the formatting data to the searching device 112 (i.e., as the search results 308). In some examples, the set processing module 306 may transmit the result objects and the formatting data to the searching device 112 via a performing device 114 and/or another intermediate device.

Figure 15:
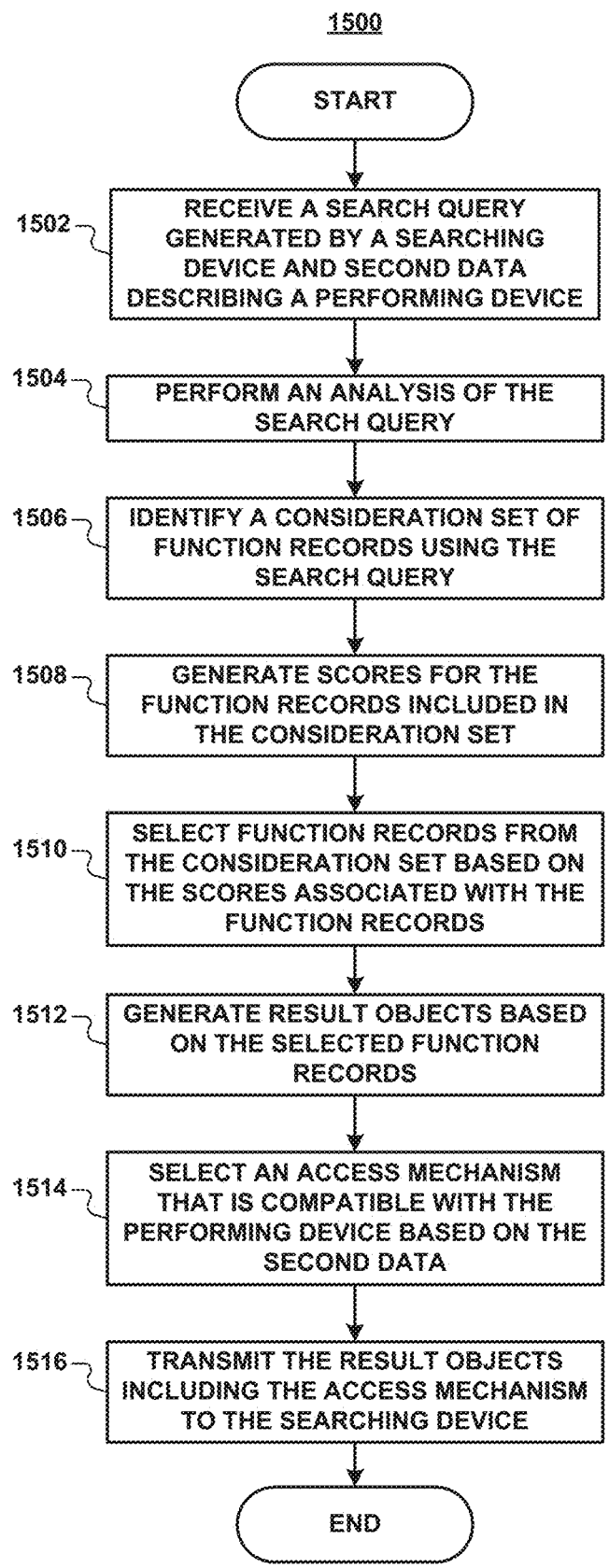

FIG. 15 is a flow diagram that shows another example method 1500 for generating search results 308 based on a received search query 300 and data corresponding to a device. The method 1500 is directed to generating search results 308 to include access mechanisms (e.g., AAMs, WAMs, and/or application download addresses) that are compatible with a performing device 114. The method 1500 is described with respect to the search module 110 of FIG. 3. In block 1502, the query analysis module 302 receives a search query 300 from (e.g., generated by) a searching device 112 and second data corresponding to a performing device 114. For example, the query analysis module 302 may receive the search query 300 from the searching device 112 and the second data from the performing device 114. In some examples, the query analysis module 302 may receive the search query 300 via the performing device 114 and/or another intermediate device. In other examples, the query analysis module 302 may receive the second data via the searching device 112 and/or another intermediate device. As explained herein, the second data may describe various attributes of the performing device 114, e.g., one or more native or web-based applications, an OS, a device type, and network connectivity associated with the performing device 114. Blocks 1504-1512 are similar to blocks 1404-1412 described above with reference to the method 1400 of FIG. 14.

In block 1514, the set processing module 306, or another module, selects an access mechanism (e.g., an AAM, a WAM, and/or an application download address) that is compatible with the performing device 114 based on the second data. In this example, the access mechanism may cause the performing device 114 to set an application (e.g., a native application, or a web-based application) into a particular state of the application, as described herein. For example, the set processing module 306, or another module, may select the access mechanism as part of generating the result objects as described above with reference to block 1412.

In block 1516, the set processing module 306 transmits the result objects including the selected access mechanism to the searching device 112 (i.e., as the search results 308). In some examples, the set processing module 306 may transmit the result objects including the selected access mechanism to the searching device 112 via the performing device 114 or another intermediate device.

Figure 16:
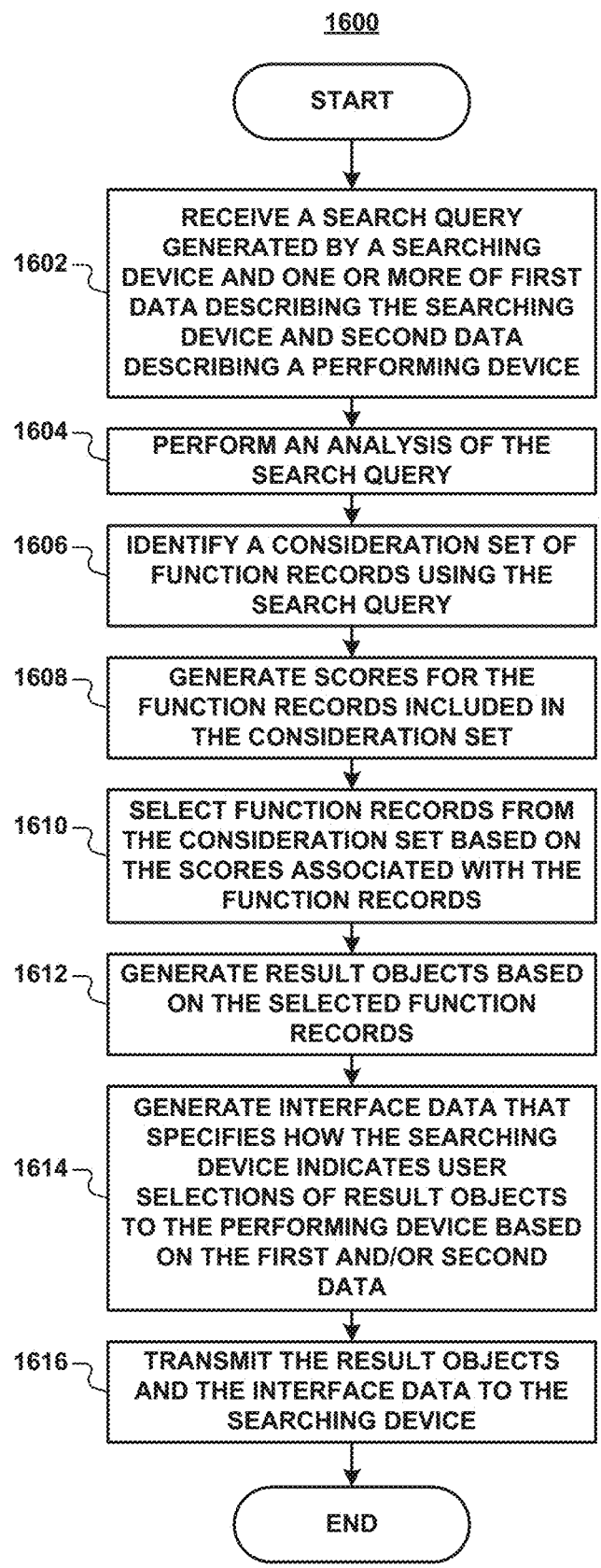

FIG. 16 is a flow diagram that shows another example method 1600 for generating search results 308 based on a received search query 300 and data corresponding to a device. The method 1600 is directed to generating search results 308 to include interface data that specifies to a searching device 112 and a performing device 114 how the searching device 112 indicates to the performing device 114 that a user has selected one of the search results 308 when the search result 308 is displayed on the searching device 112. The method 1600 is described with respect to the search module 110 of FIG. 3.

In block 1602, the query analysis module 302 receives a search query 300 from (e.g., generated by) a searching device 112 and one or more of first data corresponding to the searching device 112 and second data corresponding to a performing device 114. For example, the query analysis module 302 may receive the search query 300 and the first data from the searching device 112. In some examples, the query analysis module 302 may receive the search query 300 and the first data via the performing device 114 and/or another intermediate device. Furthermore, the query analysis module 302 may receive the second data from the performing device 114. In some examples, the query analysis module 302 may receive the second data via the searching device 112 and/or another intermediate device. As explained herein, the first data may describe various attributes of the searching device 112, e.g., an OS, a device type, and network connectivity associated with the searching device. As also explained, the second data may describe various attributes of the performing device 114, e.g., one or more native or web based applications, an OS, a device type, and network connectivity associated with the performing device 114. Blocks 1604-1612 are similar to blocks 1404-1412 described above with reference to the method 1400 of FIG. 14.

In block 1614, the set processing module 306, or another module, generates interface data based on the one or more of the first data and the second data. In this example, the interface data may specify to the searching device 112 and the performing device 114 how the searching device 112 indicates user selections of the result objects to the performing device 114. In other words, the interface data may specify how the searching device 112 indicates to the performing device 114 that a user has selected one of the result objects when the result object is displayed on the searching device 112 (e.g., when the searching device 112 renders the result object as a displayed result on the searching device 112).

In block 1616, the set processing module 306 transmits the result objects and the interface data to the searching device 112 (i.e., as the search results 308). For example, the set processing module 306 may transmit the result objects and the interface data to the searching device 112 via the performing device 114 or another intermediate device. In some examples, the searching device 112 may transmit the interface data to the performing device 114 after receiving the interface data.

Figure 17:
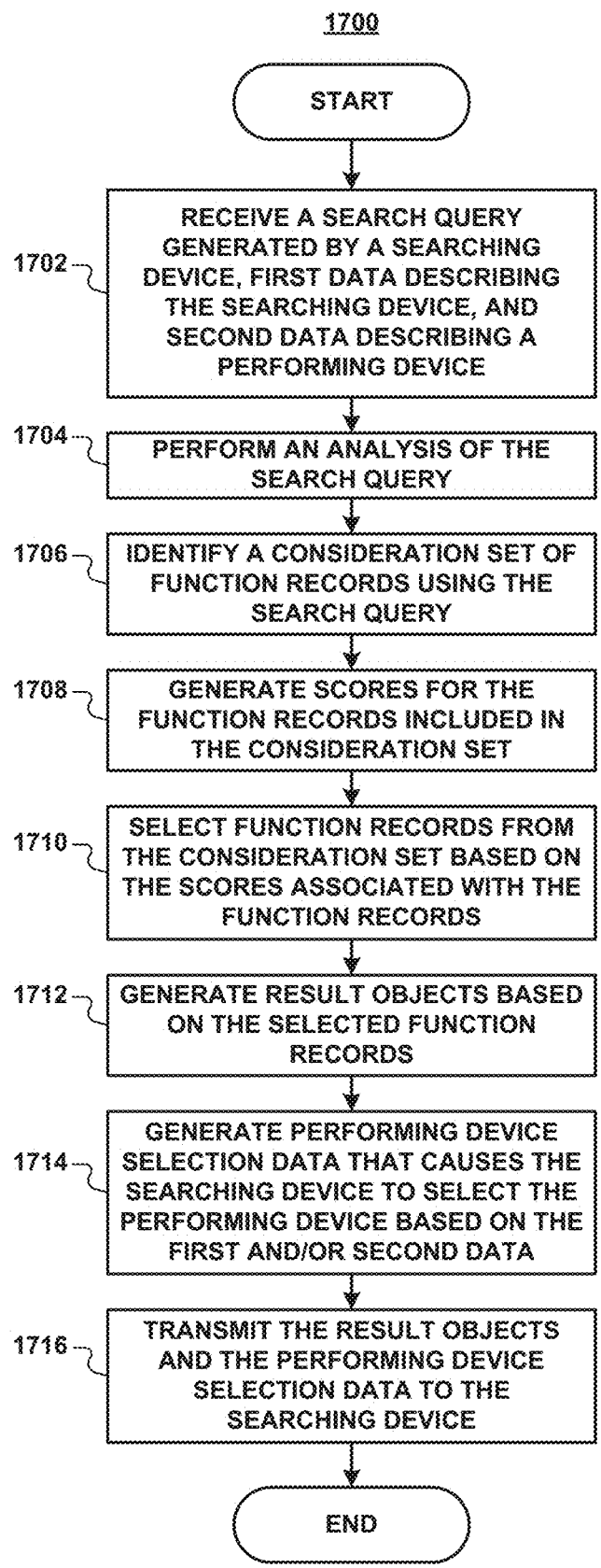

FIG. 17 is a flow diagram that shows another example method 1700 for generating search results 308 based on a received search query 300 and data corresponding to a device. The method 1700 is directed to generating search results 308 to include performing device selection data that indicates to a searching device 112 that the searching device 112 should select a particular performing device 114 from among multiple different performing devices 114. The method 1700 is described with respect to the search module 110 of FIG. 3.

In block 1702, the query analysis module 302 receives a search query 300 generated by a searching device 112 and one or more of first data corresponding to the searching device 112 and second data corresponding to a performing device 114. For example, the query analysis module 302 may receive the search query 300 and the first data from the searching device 112. In some examples, the query analysis module 302 may receive the search query 300 and the first data via the performing device 114 and/or another intermediate device. Furthermore, the query analysis module 302 may receive the second data from the performing device 114. In some examples, the query analysis module 302 may receive the second data via the searching device 112 and/or another intermediate device. As explained herein, the first data may describe various attributes of the searching device 112, e.g., geo-location data associated with the searching device 112. As also explained, the second data may describe various attributes of the performing device 114, e.g., geo-location data associated with the performing device 114. Blocks 1704-1712 are similar to blocks 1404-1412 described above with reference to the method 1400 of FIG. 14.

In block 1714, the set processing module 306, or another module, generates performing device selection data based on one or more of the first data and the second data. In this example, the performing device selection data may indicate to the searching device 112 that the searching device 112 should select the performing device 114 from among multiple different performing devices 114. In other words, the performing device selection data may cause the searching device 112 to select the performing device 114 from among the other performing devices 114.

In a specific example, the first and second data may indicate locations of the searching and performing devices 112, 114, respectively. In this example, the set processing module 306, or another module, may generate the performing device selection data using one or more of the locations of the searching and performing devices 112, 114 indicated by the first and second data. For example, the set processing module 306, or another module, may generate the performing device selection data upon determining that the performing device 114 is closest to the searching device 112 among the other performing devices 114.

In block 1716, the set processing module 306 transmits the result Objects and the performing device selection data to the searching device 112 (i.e., as the search results 308. For example, the set processing module 306 may transmit the result objects and the performing device selection data to the searching device 112 via the performing device 114 or another intermediate device.

Figure 18:
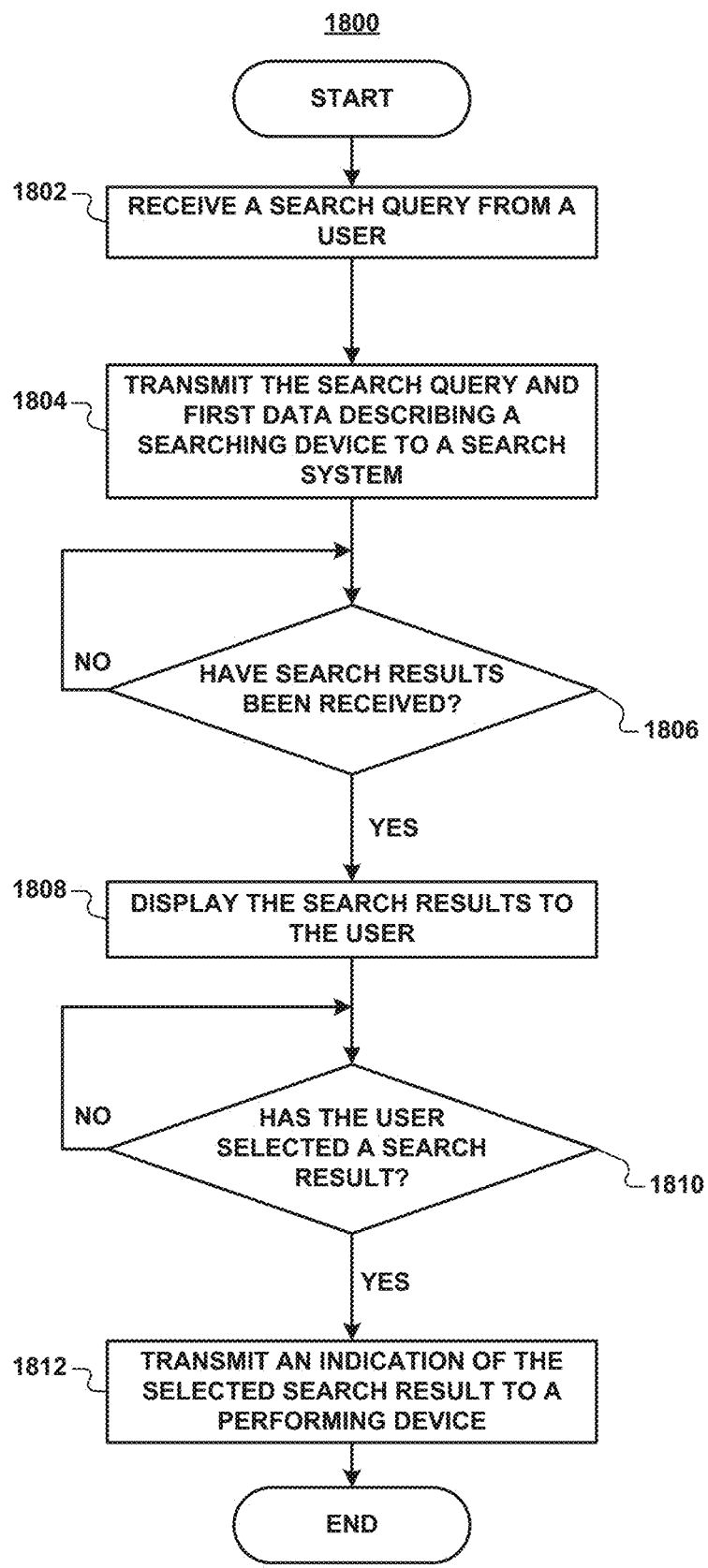
FIG. 18 is a flow diagram of an example method corresponding to operation of a searching device.

FIG. 18 is a flow diagram that shows an example method 1800 corresponding to operation of a searching device 112 according to the present disclosure. In block 1802, the searching device 112 receives a search query 300 from a user of the searching device 112. For example, the searching device 112 may have received the search query 300 from the user via a GUI of a search application executing on the searching device 112. In block 1804, the searching device 112 transmits the received search query 300 and first data corresponding to the searching device 112 to the search system 100. In some examples, the searching device 112 may transmit the search query 300 and the first data to the search system 100 via a performing device 114 and/or another intermediate device. As explained herein, the first data may describe various attributes of the searching device 112, e.g., a display type, a display resolution, graphics processing and rendering capabilities, UI capabilities, geo-location data, and network connectivity associated with the searching device 112. In block 1806, the searching device 112 waits to receive search results 308 (e.g., one or more result objects) from the search system 100 in response to transmitting the search query 300. In some examples, the searching device 112 may receive the search results from the search system 100 via a performing device 114 and/or another intermediate device. In block 1808, upon receiving the search results 308 from the search system 100, the searching device 112 displays (e.g., via the search application) the received search results 308 (e.g., generates displayed results based on the received search results 308) to the user. In block 1810, the searching device 112 waits for the user to select one of the displayed results. In block 1812, upon detecting (e.g., via the search application) a selection of a displayed result by the user, the searching device 112 transmits an indication of the selected result to a performing device 114. The indication may include a variety of different types of data. For example, the indication may include one or more access mechanisms. In some examples, the indication may include on or more AAMs. Additionally, or alternatively, the indication may include a WAM. In some examples, the indication may include an application download address, e.g., along with the AAM(s) in cases where a native application referenced by the AAM(s) is not available on the performing device 114. In other examples, the indication may reference, rather than include, one or more of the AAM(s), WAM, and application download address described above.

In the example method 1800, the search results 308 may include one or more types of data generated by the search system 100 based at least in part on the first data transmitted by the searching device 112. In some examples, the search results 308 may include one or more of formatting data, interface data, and performing device selection data, as described with reference to FIGS. 14, 16, and 17. In other examples, the search results 308 may include one or more access mechanisms (e.g., AAMs, WAMs, and/or application download addresses) selected for a particular performing device 114, as described with reference to FIG. 15.

Figure 19:
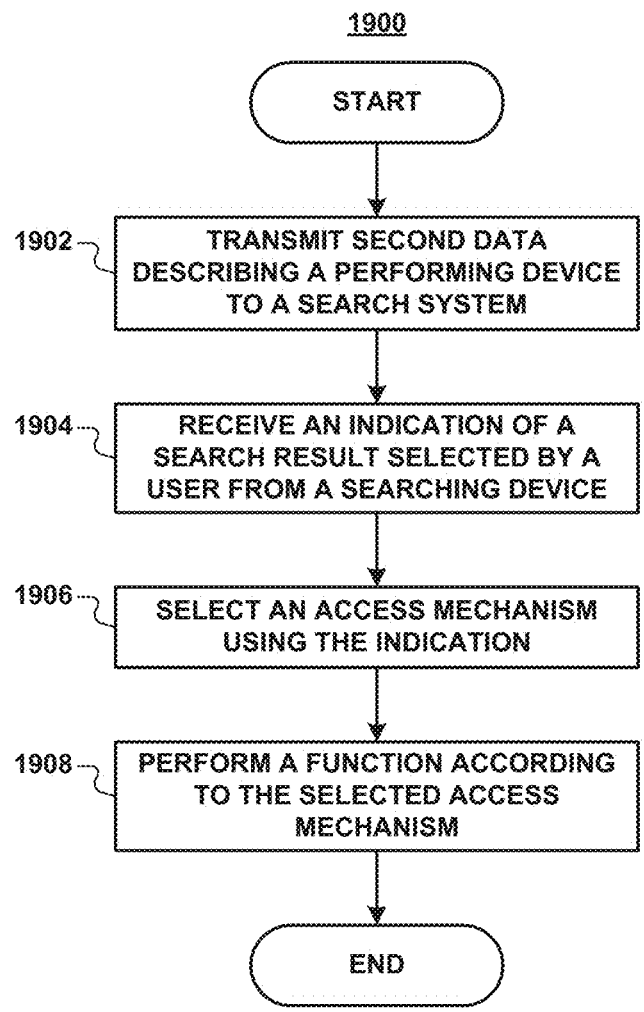
FIG. 19 is flow diagram of an example method corresponding to operation of a performing device.

FIG. 19 is a flow diagram that shows an example method 1900 corresponding to operation of a performing device 114 according to the present disclosure. In block 1902, the performing device 114 transmits second data corresponding to the performing device 114 to the search system 100. In some examples, the performing device 114 may transmit the second data to the search system 100 via a searching device 112 and/or another intermediate device. As explained herein, the second data may describe various attributes of the performing device 114, e.g., one or more native or web-based applications, an OS, a device type, geo-location data, and network connectivity associated with the performing device 114. In block 1904, the performing device 114 receives an indication of a selected result from a searching device 112. In other words, the performing device 114 receives an indication from the searching device 112 of a search result 308 that has been displayed on the searching device 112 and subsequently selected by a user of the searching device 112. The indication may include a variety of different types of data. For example, the indication may include one or more access mechanisms. In some examples, the indication may include on or more AAMs. Additionally, or alternatively, the indication may include a WAM. In some examples, the indication may include an application download address, e.g., along with the AAM(s) in cases where a native application referenced by the AAM(s) is not available on the performing device 114. In other examples, the indication may reference, rather than include, one or more of the AAM(s), WAM, and application download address described above. In still other examples, the indication may include one or more instructions or commands for the performing device 114, as described herein. In some examples, the performing device 114 may receive the indication from the searching device 112 via the search system 100 and/or another intermediate device.

In block 1906, the performing device 114 selects an access mechanism using the indication received from the searching device 112. For example, the performing device 114 may select an AAM (e.g., from the indication itself, or using the indication as a reference) if the performing device 114 has a native application that is referenced by the AAM installed on the performing device 114. In another example, the performing device 114 may select a WAM (e.g., from the indication itself, or using the indication as a reference) if the performing device 114 does not have a native application that will handle an AAM included in, or referenced by, the indication installed on the performing device 114. In still other examples, the indication may include, or reference, an application download address that directs the performing device 114 to a download site or other location (e.g., a digital distribution platform) where the performing device 114 can download a native application. For example, the native application may be referenced by an AAM also included in, or referenced by, the indication. In these examples, the performing device 114 may select the application download address and the AAM (e.g., from the indication itself, or using the indication as a reference).

In block 1908, the performing device 114 performs a function according to the selected access mechanism. For example, if the selected access mechanism is an AAM, the performing device 114 may launch a native application referenced by the AAM and set the native application into a state specified by the AAM. If the selected access mechanism is a WAM, the performing device 114 may launch a web browser application and perform a function specified by the WAM (e.g., access a web resource using a URL included in the WAM). If the performing device 114 selects an application download address and an AAM, as described above, the performing device 114 may first download a native application referenced by the AAM using the application download address. The performing device 114 may then launch the native application and set the native application into a state specified by the AAM.

In the example method 1900, the performing device 114 may receive one or more types of data generated by the search system 100 based at least in part on the second data transmitted by the performing device 114. In some examples, the performing device 114 may receive one or more access mechanisms (e.g., AAMs, WAMs, and/or application download addresses) selected specifically for the performing device 114, as described with reference to FIG. 15. In other examples, the performing device 114 may receive interface data, as described with reference to FIG. 16.

As described herein, in some examples, upon receiving an indication of a selected result, instead of launching a native application and setting the application into a particular state, or launching a web browser and accessing a web resource, the performing device 114 can show an expanded view of the selected result (e.g., a view that includes more image/text content, or detail and/or GUI input/output options). This may be beneficial in scenarios where the user would like to view the selected result on a larger screen, assuming that the searching device 112 (e.g., a smart watch) has a relatively limited display screen size and that the performing device 114 (e.g., a smart phone, or a tablet) has a relatively larger display screen size. The user may then interact with the expanded view in order to cause the performing device 114 to launch a native application and set the application into a particular state, or launch a web browser and access a web resource.

In some examples, the searching device 112 may automatically (e.g., without additional user input) indicate to the performing device 114 that an expanded view of a selected result should be shown on the performing device 114. In other examples, the searching device 112 may prompt the user to select whether an expanded view of a selected result should be shown on the performing device 114, or whether a native application referenced by the selected result should be launched by the performing device 114 using the selected result. For example, after the user selects a displayed result on the searching device 112, the searching device 112 may display a button or another GUI input element that includes the string "Show expanded view" or "Launch app." In this manner, the button or GUI input element may enable the user to select whether the performing device 114 should display an expanded view of the selected result, or launch a native application referenced by the selected result. If the user selects the button or GUI input element that includes the string "Show expanded view," the searching device 112 may transmit an indication to the performing device 114 to show an expanded view of the selected result. If the user selects the button or GUI input element that includes the string "Launch app," the searching device 112 may transmit an indication to the performing device 114 to launch the native application according to the selected result. In this example, the performing device 114 may launch the native application and set the native application into an application state specified by the selected result, as described herein.

In some examples, the searching device 112 may store search results 308 for later use. For example, at a later time following performing a search using the searching device 112, the user may recall a stored search result 308 and select the stored search result 308 to cause a performing device 114 to perform a function indicated by the stored search result 308. In one example in which the searching device 112 is a wrist watch computing device (e.g., a smart watch), the searching device 112 may store search results 308 on that the user can easily retrieve the stored search results 308 at a later time for selection, as described above. Storing search results 308 on the searching device 112 in this manner may save the user time that would otherwise be spent performing anew search for the search results 308. In some examples, the searching device 112 may store some of the search results 308. For example, the searching device 112 may maintain a history of (i.e., store) previously selected search results 308. A stored search result 308 may include some or all of the result object data associated with a search result 308 such that, upon selection of the stored search result 308, a searching device 112 can indicate to a performing device 114 to perform a function associated with the stored search result 308 and the performing device 114 is able to perform the function. In some examples, stored search results 308 may be stored on computing devices other than the searching device 112 (e.g., the performing device 114). In other examples, the searching device 112 can transfer the stored search results 308 to one or more other computing devices (e.g., the performing device 114, or another computing device).

Figure 20:
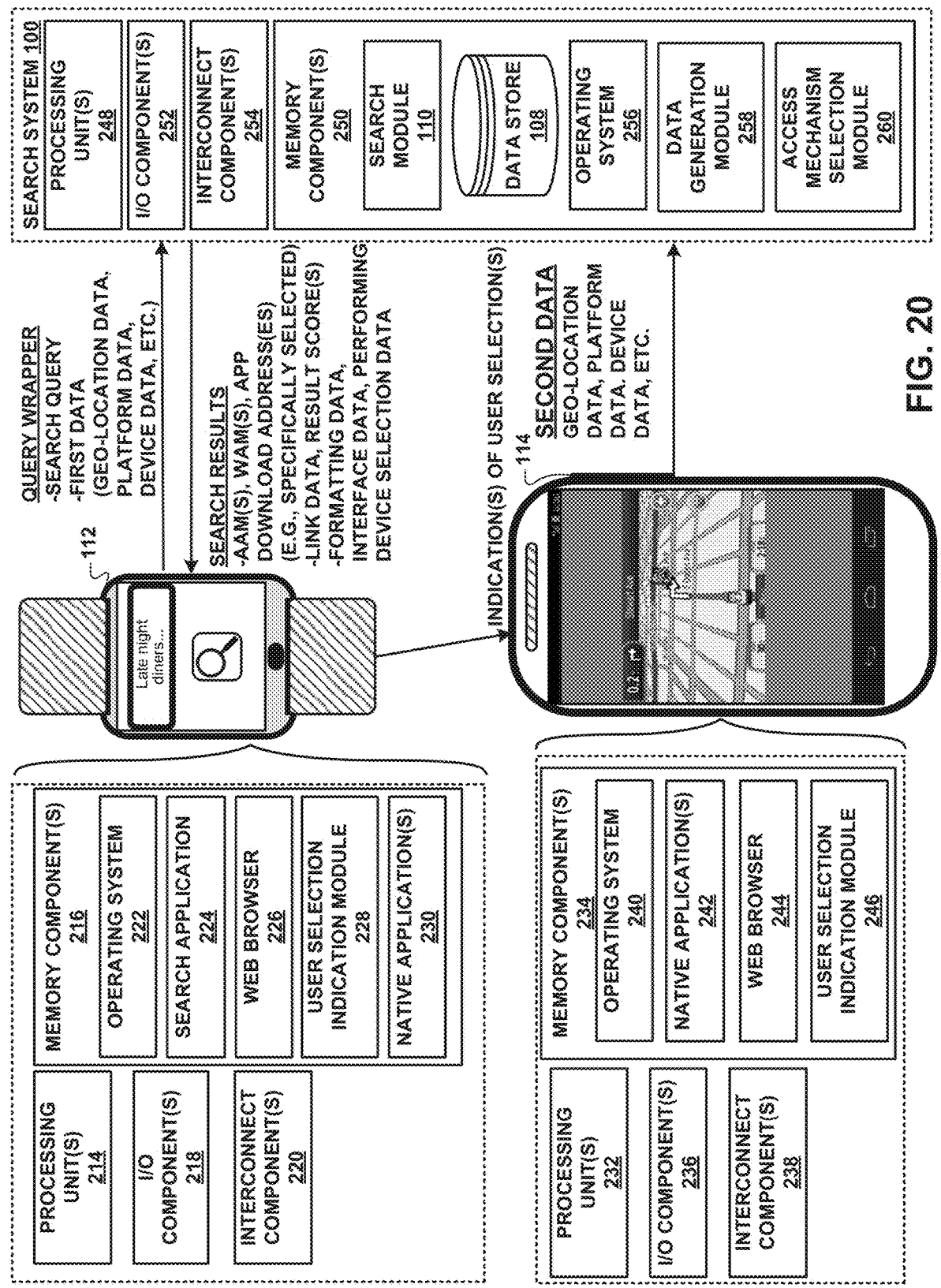
FIG. 20 is a functional block diagram of an example searching device and an example performing device in communication with an example search system.

FIG. 20 is a functional block diagram of an example searching device 112 and an example performing device 114 in communication with an example search system 100 according to the present disclosure. As shown in FIG. 20, the searching device 112 includes one or more processing units 214, one or more memory components 216, one or more input/output (I/O) components 218, and one or more interconnect components 220. The memory component(s) 216 store an OS 222, a search application 224, a web browser application 226, a user selection indication module 228, and one or more native applications 230 (e.g., native applications installed on the searching device 112). As also shown in FIG. 20, the performing device 114 includes one or more processing units 232, one or more memory components 234, one or more I/O components 236, and one or more interconnect components 238. The memory component(s) 234 store an OS 240, one or more native applications 242 (e.g., native applications installed on the performing device 114), a web browser application 244, and a user selection indication module 246. As further shown in FIG. 20, the search system 100 includes one or more processing units 248, one or more memory components 250, one or more I/O components 252, and one or more interconnect components 254. The memory component(s) 250 store the search module 110, the data store 108, an OS 256, a data generation module 258, and an access mechanism selection module 260.

Each of the processing unit(s) 214, 232, 248 may be configured to execute instructions stored in the corresponding ones of the memory component(s) 216, 234, 250 and communicate with the corresponding ones of the memory component(s) 216, 234, 250 and the I/O component(s) 218, 236, 252 (e.g., via the corresponding ones of the interconnect component(s) 220, 238, 254). Each of the OS 222, 240, 256, search application 224, web browser application 226, 244, user selection indication module 228, 246, native application(s) 230, 242, data generation module 258, and access mechanism selection module 260 may be embodied in computer-executable instructions and executed by the corresponding one of the processing unit(s) 214, 232, 248. The memory component(s) 216, 234, 250 may be configured to store executable instructions, system parameters, and other data in addition to the contents described above. Each of the I/O component(s) 218, 236, 252 may be configured to (e.g., at the direction of the corresponding ones of the processing unit(s) 214, 232, 248) receive inputs to the corresponding one of the searching and performing devices 112, 114 and the search system 100 and transmit outputs from corresponding one of the devices 112, 114 and system 100. The interconnect component(s) 220, 238, 254 (e.g., a bus) may be configured to provide communication between the corresponding ones of the processing unit(s) 214, 232, 248, the memory component(s) 216, 234, 250, and the I/O component(s) 218, 236, 252, as well as among other devices.

The units, components, and modules of the searching and performing devices 112, 114 and the search system 100 described above may enable each of the devices 112, 114 and the system 100 to perform the techniques attributed to the device or system according to this disclosure. For example, the searching device 112 (e.g., the processing unit(s) 214 executing instructions stored in the memory component(s) 216) may be configured to receive (e.g., via the I/O component(s) 218) a search query 300 from a user, transmit (e.g., via the I/O component(s) 218) the search query 300 and first data corresponding to the searching device 112 to the search system 100, and receive (e.g., via the I/O component(s) 218) search results 308 that are responsive to the search query 300 from the search system 100. The searching device 112 may be further configured to display (e.g., via the I/O component(s) 218) the search results 308 to a user of the searching device 112. The searching device 112 may also be configured to receive (e.g., via the I/O component(s) 218) a selection of one of the search results 308 from the user and transmit (e.g., via the I/O component(s) 218) an indication of the selection to the performing device 114.

To perform one or more of receiving the search query 300, transmitting the search query 300 and the first data, receiving the search results 308, displaying the search results 308, receiving the selection of one of the search results 308, and transmitting the indication of the selection, the processing unit(s) 214 may execute one or more instructions included in the memory component(s) 216. For example, the processing unit(s) 214 may execute instructions associated with one or more of the OS 222, the search application 224, the web browser application 226, the user selection indication module 228, and the native application(s) 230. In a specific example, the processing unit(s) 214 may execute instructions that cause the searching device 112 to run the OS 222. To receive the search query 300, transmit the search query 300 and the first data, receive the search results 308, display the search results 308, receive the selection of one of the search results 308, and transmit the indication of the selection, the processing unit(s) 214 may further execute instructions that cause the searching device 112 to run the search application 224 or the web browser application 226 within the OS 222. In some examples, to transmit the indication, the processing unit(s) 214 may execute instructions that cause the searching device 112 to run the user selection indication module 228, which may be a dedicated software module configured to transmit indications of user selections of search results 308 on the searching device 112 to the performing device 114.

The performing device 114 (e.g., the processing unit(s) 232 executing instructions stored in the memory component(s) 234) may be configured to transmit (e.g., via the I/O component(s) 236) second data corresponding to the performing device 114 to the search system 100, receive (e.g., via the I/O component(s) 236) the indication of the selection from the searching device 112, and perform a function indicated by the one of the search results 308 in response to receiving the indication. To perform one or more of transmitting the second data, receiving the indication, and performing the function, the processing unit(s) 232 may execute one or more instructions included in the memory component(s) 234. For example, the processing unit(s) 232 may execute instructions associated with one or more of the OS 240, the native application(s) 242, the web browser application 244, and the user selection indication module 246. In a specific example, the processing unit(s) 232 may execute instructions that cause the performing device 114 to run the OS 240. To transmit the second data, the processing unit(s) 232 may further execute instructions that cause the performing device 114 to run a dedicated software module (not shown) within the OS 240. To receive the indication, the processing unit(s) 232 may further execute instructions that cause the performing device 114 to run the user selection indication module 246 within the OS 240, which may be a dedicated software module configured to receive indications of user selections of search results 308 on the searching device 112 at the performing device 114. To perform the function, the processing unit(s) 232 may execute instructions that cause the performing device 114 to run the native application(s) 242 or the web browser application 244 within the OS 240.

The search system 100 (e.g., the processing unit(s) 248 executing instructions stored in the memory component(s) 250) may be configured to receive (e.g., via the I/O component(s) 252) the search query 300 from the searching device 112 and one or more of the first data and the second data. The search system 100 may be further configured to generate the search results 308 based on the search query 300 and based on the first and/or second data, and transmit the search results 308 to the searching device 112. To perform one or more of receiving the search query 300 and the first and/or second data, generating the search results 308, and transmitting the search results 308, the processing un it(s) 248 may execute one or more instructions included in the memory component(s) 250. For example, the processing unit(s) 248 may execute instructions associated with one or more of the search module 110, the data store 108, the OS 256, the data generation module 258, and the access mechanism selection module 260. In a specific example, the processing unit(s) 248 may execute instructions that cause the search system 110 to run the OS 256. To receive the search query 300 and the first and/or second data, to generate the search results 308, and to transmit the search results 308, the processing unit(s) 248 may further execute instructions that cause the search system 100 to run the search module 110 and the data store 108 (e.g., enable access to the data store 108) within the OS 256. In this example, to generate the search results 308 based on the search query 300 and based on the first and/or second data, the processing unit(s) 248 may also execute instructions that cause the search system 100 to run the data generation module 258 and/or the access mechanism selection module 260 within the OS 256. The data generation module 258 may be a dedicated software module configured to generate formatting data based on the first data, interface data based on the first and/or second data, and performing device selection data based on the first and/or second data. The access mechanism selection module 260 may be a dedicated software module configured to select an access mechanism that is compatible with the performing device 114 based on the second data. The processes of generating formatting data, interface data, and performing device selection data, as well as selecting access mechanisms that are compatible with the performing device 114 based on the first and/or second data are described herein.

The modules and data stores included in the search system 100 represent features that may be included in the search system 100 of the present disclosure. For example, the search module 110, the query analysis module 302, the set generation module 304, the set processing module 306, and the data store 108 may represent features included in the search system 100. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. The interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

The one or more processing units may include one or more central processing units (CPUs), graphics processing units (GPUs), digital signal processing units (DSPs), or other processing units. The one or more processing units may be configured to communicate with the one or more memory components and the one or more I/O components. For example, the one or more processing units may be configured to communicate with the one or more memory components and the one or more I/O components via the interconnect components.

A memory component, or memory, of the present disclosure may include any volatile or non-volatile media. For example, the memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HUD), magnetic tape drives, optical storage technology (e.g., compact disc (CD), digital versatile disc (DVD®), and/or Blu-ray Disc®), or any other memory components.

The one or more memory components may include (e.g., store) data described herein. For example, the one or more memory components may include the data included in the function records of the data store 108. The one or more memory components may also include instructions that may be executed by the one or more processing units. For example, the one or more memory components may include computer-readable instructions that, when executed by the one or more processing units, cause the one or more processing units to perform the various functions attributed to the modules and data stores described herein.

The one or more I/O components may refer to electronic hardware and software that provides communication with a variety of different devices. For example, the one or more I/O components may provide communication between other devices and the one or more processing units and the one or more memory components. In some examples, the one or more I/O components may be configured to communicate with a computer network. For example, the one or more I/O components may be configured to exchange data over a computer network using a variety of different physical connections, wireless connections, and protocols. The one or more I/O components may include, but are not limited to, network interface components (e.g., a network interface controller), repeaters, network bridges, network switches, routers, and firewalls. In some examples, the one or more I/O components may include hardware and software that is configured to communicate with various human interface devices, including, but not limited to, display screens, keyboards, pointer devices (e.g., a mouse), touchscreens, speakers, and microphones. In some examples, the one or more I/O components may include hardware and software that is configured to communicate with additional devices, such as external memory (e.g., external HDDs).

In some implementations, the search system 100 may be a system of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of the processing units, memory components, I/O components, and interconnect components described above. The one or more computing devices of the search system 100 may also include various human interface devices, including, but not limited to, display screens, keyboards, pointing devices (e.g., a mouse), touchscreens, speakers, and microphones. The one or more computing devices may also be configured to communicate with additional devices, such as external memory (e.g., external HDDs).

The one or more computing devices of the search system 100 may be configured to communicate with the network 106. The one or more computing devices may also be configured to communicate with one another via a computer network. In some examples, the one or more computing devices may include one or more server computing devices configured to communicate with user devices (e.g., receive search queries 300 and transmit search results 308), gather data from data sources, index the data, store the data, and/or store other documents. The one or more computing devices may reside within a single machine at a single geographic location in some examples. In other examples, the one or more computing devices may reside within multiple machines at a single geographic location. In still other examples, the one or more computing devices may be distributed across a number of geographic locations.

Additionally, the various implementations of the search system 100 described above (e.g., using one or more computing devices that include one or more processing units, memory components, I/O components, and interconnect components) are equally applicable to any of the searching device 112 and the performing device(s) 114 described herein.

What is claimed is:

1. A method of providing improved access to functionality from a search system to a searching device, the method comprising:

receiving, at a receiver of the search system from the searching device, a query wrapper including a search query, first data corresponding to the searching device, and second data corresponding to at least two performing devices establishing a short-range communication connection with the searching device, wherein the first data is indicative of one or more display attributes of the searching device, and the second data is indicative of a set of native applications which are installed on each of the at least two performing devices and are different from a web browser;

identifying, by at least one processor of the search system, a first function record based on the search query, wherein the first function record indicates a function for a first native application to perform at one of the at least two performing devices;

identifying whether the first native application corresponding to the first function record is installed on a first performing device of the at least two performing devices based on the second data;

in response to identifying that the first native application corresponding to the first function record is installed on the first performing device, selecting, by the at least one processor of the search system, a first access mechanism in the first function record, wherein the first access mechanism links to a specific state of the first native application via a native application version of the first native application, in response to identifying that the first native application corresponding to the first function record is not installed on the first performing device, selecting, by the at least one processor of the search system, a second access mechanism in the first function record, wherein the second access mechanism links to a native application download address for the first native application, generating, by the at least one processor of the search system, a result object based on at least one of (i) the first access mechanism and (ii) the second access mechanism;

generating, by the at least one processor of the search system, formatting data based on the first data, wherein the formatting data indicates a manner by which the searching device is to display a search result given the one or more display attributes of the searching device;

generating, using the at least one processor of the search system, the search result based on the generated result object and the formatting data, the search result being configured to be displayed on the searching device; and transmitting, using a transmitter of the search system, the search result from the search system to the searching device, wherein the one or more display attributes indicated by the first data indicate user interface capabilities of the searching device, and wherein the searching device and the at least two performing devices are different devices from each other.

2. The method of claim 1, wherein the formatting data is configured to define one or more of a user interface element configured to perform at least one of receiving an input from a user and providing an output to the user, and a real-time data element configured to display real-time data to the user, and wherein the one or more of the user interface element and the real-time data element are configured to be included in the search result when the search result is displayed on the searching device.

3. The method of claim 1, wherein generating the search result comprises:

generating interface data based on one or more of the first data and the second data, wherein the interface data is configured to specify to the searching device and the first performing device how the searching device indicates to the first performing device that a user has selected the search result when the search result is displayed on the searching device; and generating the search result such that the search result includes the interface data.

4. The method of claim 3, wherein the interface data is configured to cause the searching device to transmit to the first performing device the at least one of (i) the first access mechanism and (ii) the second access mechanism.

5. The method of claim 3, wherein the interface data is configured to cause the searching device to transmit to the first performing device an identifier that indicates the search result, and wherein the interface data is further configured to cause the first performing device to retrieve the search result using the identifier and select the at least one of (i) the first access mechanism and (ii) the second access mechanism from the search result.

6. The method of claim 1, wherein the first data further indicates a geographic location of the searching device, wherein the second data further indicates a geographic location of the at least two performing devices, and wherein the method further comprises generating performing device selection data based on one or more of the geographic locations of the searching device and the at least two performing devices by determining that the first performing device is the most proximate to the searching device among the at least two performing devices based on the geographic locations.

7. The method of claim 1, wherein the one or more display attributes indicated by the first data indicate one or more of:
a display type of the searching device;
a display resolution associated with the searching device;
graphics processing and rendering capabilities of the searching device;
network connectivity associated with the searching device; or
a location of the searching device.

8. The method of claim 1, wherein the second data indicates one or more of:
one or more native applications installed on the each of the at least two performing devices;
one or more web-based applications included on the each of the at least two performing devices;
an operating system of the each of the at least two performing devices;
a device type associated with the each of the at least two performing devices;
network connectivity associated with the each of the at least two performing devices; or
a location of the each of the at least two performing devices.

9. The method of claim 1, wherein receiving the search query from the searching device comprises receiving the search query from the searching device via the first performing device, and wherein transmitting the search result to the searching device comprises transmitting the search result to the searching device via the first performing device.

10. A server for providing improved access to functionality to a searching device, the server comprising:
at least one processor; and
a memory configured to store instructions which, when executed by the at least one processor, cause the at least one processor to perform operations comprising:
receiving, from the searching device, a query wrapper including a search query, first data corresponding to the searching device, and second data corresponding to at least two performing devices establishing a short-range communication connection with the searching device, wherein the first data is indicative of one or more display attributes of the searching device, and the second data is indicative of a set of native applications which are installed on each of the at least two performing devices and are different from a web browser;
identifying a first function record based on the search query, wherein the first function record indicates a function for a first native application to perform at one of the at least two performing devices;
identifying whether the first native application corresponding to the first function record is installed on a first performing device of the at least two performing devices based on the second data;
in response to identifying that the first native application corresponding to the first function record is installed on the first performing device, selecting, by the at least one processor of the search system, a first access mechanism in the first function record, wherein the first access mechanism links to a specific state of the first native application via a native application version of the first native application,
in response to identifying that the first native application corresponding to the first function record is not installed on the first performing device, selecting, by the at least one processor of the search system, a second access mechanism in the first function record, wherein the second access mechanism links to a native application download address for the first native application,
generating a result object based on at least one of (i) the first access mechanism and (ii) the second access mechanism;
generating formatting data based on the first data, wherein the formatting data indicates a manner by which the searching device is to display a search result given the one or more display attributes of the searching device;
generating the search result based on the generated result object and the formatting data, the search result being configured to be displayed on the searching device; and
transmitting the search result from the search system to the searching device,
wherein the one or more display attributes indicated by the first data indicate user interface capabilities of the searching device, and
wherein the searching device and the at least two performing devices are different devices from each other.

11. The server of claim 10,
wherein the formatting data is configured to define one or more of a user interface element configured to perform at least one of receiving an input from a user and providing an output to the user, and a real-time data element configured to display real-time data to the user, and
wherein the one or more of the user interface element and the real-time data element are configured to be included in the search result when the search result is displayed on the searching device.

12. The server of claim 10,
wherein the at least one processor is configured to generate interface data based on one or more of the first data and the second data,
wherein the interface data is configured to:
specify to the searching device and the first performing device how the searching device indicates to the first performing device that a user has selected the search result when the search result is displayed on the searching device, and
wherein the at least one processor is configured to generate the search result such that the search result includes the interface data.

13. The server claim 12, wherein the interface data is configured to cause the searching device to transmit to the first performing device the at least one of (i) the first access mechanism or (ii) the second access mechanism.

14. The server of claim 12,
wherein the interface data is configured to cause the searching device to transmit to the first performing device an identifier that indicates the search result, and
wherein the interface data is further configured to cause the first performing device to retrieve the search result using the identifier and select the at least one of (i) the first access mechanism or (ii) the second access mechanism from the search result.

15. The server of claim 10,
wherein the first data further indicates a geographic location of the searching device,
wherein the second data further indicates a geographic location of the at least two performing devices, and
wherein the at least one processor is further configured to generate performing device selection data based on one or more of the geographic locations of the searching device and the at least two performing devices by determining that the performing device is the most proximate to the searching device among the at least two performing devices based on the geographic locations.

16. The server of claim 10, wherein the one or more display attributes indicated by the first data indicate one or more of:
a display type of the searching device;
a display resolution associated with the searching device;
graphics processing and rendering capabilities of the searching device;
network connectivity associated with the searching device; or
a location of the searching device.

17. The server of claim 10, wherein the second data indicates one or more of:
one or more native applications installed on the each of the at least two performing devices;
one or more web-based applications included on the each of the at least two performing devices;
an operating system of the each of the at least two performing devices;
a device type associated with the each of the at least two performing devices;
network connectivity associated with the each of the at least two performing devices; or
a location of the each of the at least two performing devices.

18. The server of claim 10,
wherein the at least one processor is configured to receive the search query from the searching device via the first performing device, and
wherein transmitting the search result to the searching device comprises transmitting the search result to the searching device via the first performing device.

19. A non-transitory computer-readable medium storing instructions which, when executed by at least one processor of a server, cause the at least one processor to perform operations comprising:
controlling to receive, from a searching device, a query wrapper including a search query, first data corresponding to the searching device, and second data corresponding to at least two performing devices establishing a short-range communication connection with the searching device, wherein the first data is indicative of one or more display attributes of the searching device, and the second data is indicative of a set of native applications which are installed on each of the at least two performing devices and are different from a web browser;
identifying a first function record based on the search query, wherein the first function record indicates a function for a first native application to perform at one of the at least two performing devices;
identifying whether the first native application corresponding to the first function record is installed on a first performing device of the at least two performing devices based on the second data;
in response to identifying that the first native application corresponding to the first function record is installed on the first performing device, selecting, by the at least one processor of the search system, a first access mechanism in the first function record, wherein the first access mechanism links to a specific state of the first native application via a native application version of the first native application,
in response to identifying that the first native application corresponding to the first function record is not installed on the first performing device, selecting, by the at least one processor of the search system, a second access mechanism in the first function record, wherein the second access mechanism links to a native application download address for the first native application,
generating a result object based on at least one of (i) the first access mechanism and (ii) the second access mechanism;
generating formatting data based on the first data, wherein the formatting data indicates a manner by which the searching device is to display a search result given the one or more display attributes of the searching device;
generating the search result based on the generated result object and the formatting data, the search result being configured to be displayed on the searching device; and
transmitting the search result from the search system to the searching device,
wherein the one or more display attributes indicated by the first data indicate user interface capabilities of the searching device, and
wherein the searching device and the at least two performing devices are different devices from each other.

* * * * *